US010406916B2

(12) United States Patent
Clarke et al.

(10) Patent No.: US 10,406,916 B2
(45) Date of Patent: Sep. 10, 2019

(54) DRIVELINE AND METHOD OF CONTROLLING A DRIVELINE

(71) Applicant: JAGUAR LAND ROVER LIMITED, Warwickshire (GB)

(72) Inventors: Richard Clarke, Coventry (GB); Pete Stares, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 563 days.

(21) Appl. No.: 14/911,478

(22) PCT Filed: Aug. 19, 2014

(86) PCT No.: PCT/EP2014/067656
§ 371 (c)(1),
(2) Date: Feb. 11, 2016

(87) PCT Pub. No.: WO2015/024933
PCT Pub. Date: Feb. 26, 2015

(65) Prior Publication Data
US 2016/0185216 A1 Jun. 30, 2016

(30) Foreign Application Priority Data
Aug. 19, 2013 (GB) .................................. 1314795.4

(51) Int. Cl.
*B60W 10/119* (2012.01)
*B60K 23/08* (2006.01)
(Continued)

(52) U.S. Cl.
CPC ................ *B60K 23/08* (2013.01); *B60K 6/36* (2013.01); *B60K 6/387* (2013.01); *B60K 6/52* (2013.01);
(Continued)

(58) Field of Classification Search
CPC ......................... B60W 2520/403; B60K 23/08
See application file for complete search history.

(56) References Cited

U.S. PATENT DOCUMENTS

| 5,570,287 A | 10/1996 | Campbell et al. |
| 6,223,115 B1 | 4/2001 | Batistic |

(Continued)

FOREIGN PATENT DOCUMENTS

| CN | 101223047 | 7/2008 |
| CN | 102922994 | 2/2013 |

(Continued)

OTHER PUBLICATIONS

The Chinese Search Report for CN Application No. 201480045671.8, dated May 2, 2017.

(Continued)

*Primary Examiner* — William Kelleher
*Assistant Examiner* — Gregory T Prather
(74) *Attorney, Agent, or Firm* — Carlson, Gaskey & Olds

(57) ABSTRACT

The invention relates to a motor vehicle driveline and a method of controlling same. The driveline includes front wheels (11, 12) and rear wheels (14, 15), a controller (40) and a prime mover (11). Either the front wheels (11, 12) or all wheels are connected to the prime mover (11). The rear wheels (14, 15) may be connected via a prop shaft (23) with clutches (22; 27) at both ends. The decision to switch between 2WD and 4WD is taken on basis of speed-dependent trigger conditions.

21 Claims, 13 Drawing Sheets

(51) Int. Cl.
*B60K 17/35* (2006.01)
*B60K 6/36* (2007.10)
*B60K 6/387* (2007.10)
*B60K 6/52* (2007.10)
*B60K 17/348* (2006.01)

(52) U.S. Cl.
CPC ............ *B60K 17/348* (2013.01); *B60K 17/35* (2013.01); *B60K 23/0808* (2013.01); *B60W 10/119* (2013.01); *B60W 2520/10* (2013.01); *B60W 2520/403* (2013.01); *B60Y 2200/92* (2013.01); *Y10S 903/909* (2013.01); *Y10S 903/914* (2013.01); *Y10S 903/916* (2013.01)

(56) References Cited

U.S. PATENT DOCUMENTS

| | | | |
|---|---|---|---|
| 9,630,493 B2* | 4/2017 | Stares | B60W 30/182 |
| 2007/0112499 A1* | 5/2007 | Matsuno | B60W 10/119 |
| | | | 701/93 |
| 2007/0193793 A1 | 8/2007 | Burrows et al. | |
| 2009/0024262 A1 | 1/2009 | Amamiya | |
| 2009/0127014 A1 | 5/2009 | Ushiroda et al. | |
| 2010/0161190 A1* | 6/2010 | McCann | B60K 17/20 |
| | | | 701/69 |
| 2010/0262326 A1* | 10/2010 | Buszek | B60K 17/35 |
| | | | 701/31.4 |
| 2010/0320833 A1 | 12/2010 | Batistic | |
| 2012/0095659 A1* | 4/2012 | Rodrigues | B60K 23/08 |
| | | | 701/69 |
| 2012/0203416 A1* | 8/2012 | Yoshimura | B60K 6/445 |
| | | | 701/22 |
| 2012/0214641 A1* | 8/2012 | McCann | B60K 17/20 |
| | | | 477/35 |
| 2012/0271526 A1* | 10/2012 | Oishi | B60T 7/042 |
| | | | 701/99 |
| 2012/0290179 A1* | 11/2012 | Oishi | B60T 7/042 |
| | | | 701/54 |
| 2014/0058638 A1* | 2/2014 | Taniguchi | B60W 10/06 |
| | | | 701/69 |
| 2014/0067217 A1 | 3/2014 | Stares | |
| 2014/0067219 A1* | 3/2014 | Stares | B60K 17/34 |
| | | | 701/69 |
| 2014/0074368 A1* | 3/2014 | Stares | B60K 17/34 |
| | | | 701/69 |
| 2014/0121870 A1* | 5/2014 | Lee | B60W 20/10 |
| | | | 701/22 |
| 2014/0297141 A1* | 10/2014 | Nihanda | B60K 23/0808 |
| | | | 701/58 |
| 2015/0175148 A1* | 6/2015 | Chimner | B60W 50/082 |
| | | | 701/69 |
| 2015/0203117 A1* | 7/2015 | Kelly | B60K 31/02 |
| | | | 701/91 |
| 2016/0039284 A1* | 2/2016 | Osborn | B60K 17/35 |
| | | | 180/245 |

FOREIGN PATENT DOCUMENTS

| | | |
|---|---|---|
| CN | 103517818 | 1/2014 |
| EP | 2112053 A1 | 10/2009 |
| GB | 2407804 A | 5/2005 |
| GB | 2488155 A | 8/2012 |
| GB | 2488241 A | 8/2012 |
| JP | H10272955 | 10/1998 |

OTHER PUBLICATIONS

Combined Search and Examination Report under Sections 17 and 18(3) for Application No. GB1414693.0 dated Feb. 23, 2015.
Combined Search and Examination Report under Sections 17 and 18(3) for Application No. GB1314795.4 dated Mar. 6, 2014.
International Search Report and Written Opinion of the International Searching Authority for International application No. PCT/EP2014/067656 dated Oct. 29, 2014.
The Search Report for Chinese Application No. 201480045671.8, dated Nov. 27, 2018.

* cited by examiner

Driveline Disconnect / Active Driveline
Example Interactions with Driver Selected Modes (e.g. Terrain Response)

Example 1 - Permanently connected or disconnected according to terrain response mode

|  |  | Mode | | | |
| --- | --- | --- | --- | --- | --- |
|  | Normal (SP off) | Eco | Winter / GGS | Sand | Dynamic |
| Status | Automatic connect / disconnect | Permanently disconnected | Permanently connected | Permanently connected | Permanently connected |

Figure 9

Example 2 - Modify thresholds according to driver selected modes

|  | Mode | | | | |
| --- | --- | --- | --- | --- | --- |
|  | Normal | Eco | Winter/ GGS | Sand | Dynamic |
| Example 1: Vehicle Speed (connected below x kph) | 30 kph | 10 kph | 60kph | 100kph | 100kph |
| Example 2: Throttle Pedal Position | 40% | 60% | 20% | 0% | 30% |
| Example 3: Engine Torque (Requested /Actual) | 100 Nm | 150 Nm | 75 Nm | 10 Nm | 75 Nm |
| Example 4: Lateral Acceleration | 2 m/s^2 | 3 m/s^2 | 1 m/s^2 | 2 m/s^2 | 1.5 m/s^2 |
| Example 5: Wheel Slip | 10% | 20% | 5% | 5% | 5% |
| Example 6: Yaw Rate Error (Oversteer / Understeer) | 5 deg/s | 10 deg /s | 5 deg / s | 5 deg / s | 3 deg / s |

Example values for illustration only.

Figure 10

Example 3 - Modify connect / disconnect rate according to driver selected modes

|  | Mode | | | | |
| --- | --- | --- | --- | --- | --- |
|  | Normal | Eco | Winter / GGS | Sand | Dynamic |
| Connect Rate | Standard | Standard | High | High | High |

Standard: Normal connection rate for optimal NVH performance
High: Increased connection rate for improved vehicle traction and dynamic response, with reduced NVH performance

Figure 11

Example 4 - Enable or disable evaluators according to driver selected modes

|  | Mode | | | | |
| --- | --- | --- | --- | --- | --- |
|  | Normal | Eco | Winter / GGS | Sand | Dynamic |
| Vehicle Speed Evaluator | Enabled | Disabled | Enabled | Enabled | Enabled |
| Throttle Pedal Evaluator | Enabled | Disabled | Enabled | Enabled | Enabled |
| Engine Torque Evaluator (Actual / Requested) | Disabled | Disabled | Disabled | Disabled | Enabled |
| Lateral Acceleration Evaluator | Enabled | Disabled | Disabled | Disabled | Enabled |
| Wheel Slip Evaluator | Enabled | Disabled | Enabled | Enabled | Enabled |
| Yaw Rate Error Evaluator (Oversteer / Understeer) | Disabled | Disabled | Disabled | Disabled | Enabled |
| Reverse Gear Detection Evaluator | Enabled | Disabled | Enabled | Enabled | Enabled |
| Hill Descent Control Evaluator | Enabled | Disabled | Enabled | Enabled | Disabled |
| Low Temperature Detection Evaluator | Disabled | Disabled | Enabled | Disabled | Disabled |
| SCS Activity Detection Evaluator | Enabled | Enabled | Enabled | Enabled | Enabled |

Examples only - not representative of actual system behaviour

Figure 12

Notes

Any of the above scenarios could be linked to driver selected features other than terrain response. E.g change system behaviour if:

1) DSC / Traction control disabled,
2) Gear selector in sport mode
3) Driver uses paddles or gear shifter to manually select gears
4) Hybrid or stop start system enabled or disabled

DRIVELINE AND METHOD OF CONTROLLING A DRIVELINE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable to change the number of wheels that provide torque to drive the vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. A driver operable selector may be provided to allow the driver to select two wheel or four wheel operation. Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system. The system disclosed in GB2407804 employs clutch arrangements to enable dynamic driveline reconnection.

In some known dynamic driveline reconnect systems the vehicle is operable automatically to disconnect the driveline to two of the wheels when a prescribed condition is met so that the vehicle operates in a two wheel drive mode. The system automatically reconnects the driveline to enable four wheel drive operation when the prescribed condition is not met.

It is an aim of embodiments of the present invention to at least partially mitigate the disadvantages of known dynamic driveline systems.

STATEMENT OF THE INVENTION

Embodiments of the invention may be understood by reference to the appended claims.

Aspects of the invention provide a motor vehicle and a method.

In an aspect of the invention for which protection is sought there is provided a motor vehicle driveline having:
at least first and second groups of one or more wheels; and
control means,
the driveline being operable by means of the control means to connect a torque transmission path from prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the driveline being operable to connect the second group to the torque transmission path by means of an auxiliary portion thereof, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels,
when the driveline is in the first mode the control means being operable to cause the driveline to transition to the second mode when one or more trigger conditions in respect of one or more vehicle operating parameters is met, the one or more trigger conditions being determined at least in part in dependence on a speed value corresponding to vehicle speed.

The driveline may be referred to as an active driveline since the driveline is operable to assume the first or second modes automatically without requiring receipt of a specific user command to assume the first or second mode.

A powertrain of a vehicle may be considered to comprise prime mover means and the driveline. The powertrain may likewise be considered to be an active powertrain. The powertrain may comprise a transmission. The transmission may be considered to be part of the driveline in some embodiments. Alternatively the driveline may be considered to comprise those components that deliver drive torque from an output of the transmission to ground. Thus the driveline (and powertrain) may include the wheels of the vehicle that are operable to be driven by the prime mover means.

The speed value corresponding to vehicle speed may be a speed of a portion of the driveline or of the powertrain. It is to be understood that correspondence between the speed of the portion of the driveline or powertrain and vehicle speed may be direct if the portion is for example a road wheel, or proportional, based on a gear ratio between a wheel driven by the driveline and the portion of the driveline or powertrain at which speed is measured. The speed may be determined by reference to a wheel speed sensor, a prop shaft speed sensor, a drive shaft speed sensor or any other suitable sensor. Alternatively this speed may be determined in dependence on a speed of the prime mover means such as an engine of the vehicle in combination with a value of an instant gear ratio between the prime mover means and a portion of the driveline downstream of a transmission of the vehicle, such as a road wheel, drive shaft or the like. Thus, a gear ratio of the transmission at a given moment in time may be required to be known. Other arrangements are also useful.

Optionally the speed value may be a vehicle reference speed corresponding to a speed of the vehicle over ground. Methods of obtaining a vehicle reference speed are well known and include for example setting the reference speed value equal to an average wheel speed or the speed of the second slowest wheel.

Optionally the first and/or second releasable torque transmitting means may be operable to vary an amount of torque transmitted thereby, from substantially zero to a largest amount the torque transmitting means is able to transmit. It is to be understood that when the releasable torque transmitting means is in an open or released condition, a small amount (typically negligible) of torque may still be transmitted thereby. This may be due for example to hydraulic fluid losses associated with residual coupling between input and output portions thereof, or other residual coupling, and any such small amounts are ignored for the present purposes.

Optionally, each trigger condition has a respective identity, the control means being operable to control the driveline to transition from the first mode to the second mode at a prescribed connect rate.

It is to be understood that the rate of connection of the second group of one or more wheels to the torque transmission path from the prime mover means by the auxiliary portion of the driveline may be considered to relate to a time period within which a connect operation is performed. The higher the rate of connection, the smaller the time period over which the driveline completes an operation in which driveline transitions from the first mode to the second mode. Thus reference to a connect rate may be alternatively considered to be reference to a time period within which a connect operation is completed, i.e. a time period within which a transition from the first mode to the second mode may be completed. By completed is meant that the first and second releasable torque transmitting means have completed an operation in which a prop shaft is connected to the torque transmission path from the prime mover means and the second group of one or more wheels. In the case where the releasable torque transmission means comprises clutch means in which a clutch pressure is applied to maintain respective torque transmitting components in torque-transmitting communication with one another, completion is understood to mean that the clutch means is fully (and not partially) closed. That is, the torque-transmitting components are in communication with one another thereby to allow torque transmission therebetween, and that the amount of clutch pressure has reached a required value wherein substantially all of the torque applied to an input portion of the clutch means is transferred by the clutch means to an output portion thereof such that drive torque is transmitted to one or more wheels of the vehicle. It is to be understood that in some embodiments clutch pressure may be gauged by reference to a pressure of a hydraulic fluid. In some alternative embodiments having electrically actuated torque transmitting means, clutch pressure may be gauged by reference to an amount of current required to cause an actuator to apply a required amount of pressure between the torque transmitting components.

Thus, the control means may be operable to control the driveline to transition from the first mode to the second mode over a time period the length of which is responsive to the identity of the trigger condition that is met.

In some embodiments where the releasable torque transmitting means comprises a clutch or clutch means, reference to a connect rate may be understood as reference to a rate of closure of the clutch or clutch means. In some embodiments reference to a connect rate may be understood as reference to a total time taken for a plurality of clutch means to fully close; for example a time delay between closure of one clutch means and closure of another clutch means may be changed, resulting in a different connect rate. In some arrangements it may be advantageous to close clutch means of one of the first and second releasable torque transmitting means before closing the clutch means of the other of the first and second releasable torque transmitting means in order to spin up the prop shaft before the other clutch means is closed. This can reduce noise, vibration and/or harshness (NVH) associated with driveline connect operations. However where a connect operation is urgent, the clutch means of the first and second releasable torque transmitting means may be closed substantially simultaneously or one immediately after the other with little or no delay between the respective closure operations.

It is to be understood that when the prop shaft is disconnected from both the torque transmission path from the prime mover means and said second group of one or more wheels the prop shaft may be substantially stationary even when the vehicle is moving. This has the advantage that energy losses associated with prop shaft rotation may be reduced or eliminated in some embodiments.

It is to be understood that reference herein to a group of one or more wheels includes reference to a group having a membership of only one wheel.

Optionally, the connect rate is determined in dependence at least in part on the identity of the trigger condition that is met.

Embodiments of the invention have the advantage that the vehicle is able to control the driveline in such a manner as to provide optimum performance characteristics in a given situation. Thus, for example in circumstances where a transition to the second mode may be more urgent, such as when the vehicle is experiencing excessive wheel slip, the connect rate may be made faster (i.e. the connect operation completed sooner) than in circumstances where the transition is less urgent.

The connect rate may be determined at least in part in dependence on the vehicle speed value.

That is, the time required to complete the transition from the first mode to the second mode may change as a function of vehicle speed value.

In some embodiments the connect rate may increase as a function of increasing vehicle speed value. This feature has the advantage that if the control means causes the second mode to be selected the driveline will assume the second mode more quickly at higher vehicle speed values. This has the advantage that if the second mode is assumed when travelling at a relatively high speed, for example in the event of a skid, the second mode may be assumed more quickly than in the event the vehicle is travelling more slowly.

Furthermore, this feature has the advantage that the benefit of a higher connection operation rate may be enjoyed without a noticeable decrease in NVH (noise, vibration and harshness) performance. This is because a higher rate of connection is only employed at higher vehicle speeds where NVH due to connection of the second pair of wheels may be masked by ambient vehicle noise and vibrations due to the speed of movement of the vehicle.

The set of trigger conditions may include the condition that an instantaneous amount of torque being delivered to one or more wheels is above a prescribed instantaneous torque threshold, the prescribed instantaneous torque threshold being determined at least in part in dependence on vehicle speed value.

Alternatively or in addition, the set of trigger conditions may include the condition that an instantaneous amount of torque developed by the prime mover means is above a prescribed instantaneous prime mover torque threshold, the prescribed instantaneous prime mover torque threshold being determined at least in part in dependence on vehicle speed value.

Alternatively or in addition, the set of trigger conditions may include the condition that a steering angle is above a prescribed steering angle threshold, the prescribed steering angle threshold being determined at least in part in dependence on vehicle speed value.

The steering angle threshold may be a steering wheel angle threshold or a steerable road wheel angle threshold.

Alternatively or in addition, the set of trigger conditions may include the condition that a rate of change of steering angle exceeds a steering angle rate threshold, the steering angle rate threshold being determined at least in part in dependence on vehicle speed value.

The rate of change of steering angle may be a rate of change of steering wheel angle or a rate of change of steerable road wheel angle.

Alternatively or in addition, the set of trigger conditions may include the condition that steering angle and rate of change of steering angle exceed respective threshold values.

Alternatively or in addition, the set of trigger conditions may include the condition that an amount of slip of one or more wheels exceeds a prescribed slip threshold, the prescribed slip threshold being determined at least in part in dependence on vehicle speed value.

Alternatively or in addition, the set of trigger conditions may include the condition that an instantaneous amount of lateral acceleration is above a prescribed instantaneous lateral acceleration threshold, the prescribed instantaneous lateral acceleration threshold being determined at least in part in dependence on vehicle speed value.

Alternatively or in addition, the set of trigger conditions may include the condition that a throttle or accelerator pedal position value is above a prescribed pedal position value threshold, the prescribed pedal position value threshold being determined at least in part in dependence on vehicle speed value.

Advantageously the control means may be operable to cause the prop shaft to be disconnected from both the torque transmission path from the prime mover means and said second group of one or more wheels when the driveline is in the first mode.

In an aspect of the invention for which protection is sought there is provided a vehicle powertrain comprising a driveline according to a previous aspect.

The powertrain may comprise prime mover means. The prime mover means may comprise at least one selected from amongst an engine and an electric machine.

Optionally the prime mover means comprises an engine and an electric machine.

Thus the vehicle may be a hybrid electric vehicle, an electric vehicle or a conventional vehicle. The engine may be an internal combustion engine.

In a further aspect of the invention for which protection is sought there is provided a vehicle comprising a driveline or powertrain according to a preceding aspect.

Optionally the control means is operable to control the vehicle to operate in a selected one of a plurality of driving modes in each of which one or more vehicle sub-systems are operated in a prescribed one of a plurality of respective configurations.

The set of one or more trigger conditions may be determined at least in part in dependence on the selected driving mode.

The driving modes may include at least one selected from amongst an on-road or on-highway mode suited to driving on relatively smooth roads with a surface coefficient of friction substantially equal to unity (e.g. a 'normal' mode or 'special programs off' (SPO) mode), a mode suited to driving on surfaces of relatively low surface coefficient of friction such as grass, gravel or snow surfaces (e.g. a 'grass/gravel/snow' mode); a mode suited to travel over sand (e.g. a 'sand' mode), a mode suited to travel over boulders (e.g. a 'boulder' mode), and a mode suited to travel at relatively high rates of acceleration on relatively smooth roads with a surface coefficient of friction substantially equal to unity (e.g. a 'dynamic' mode). The driving modes may be referred to as 'terrain response' (or 'TR' (RTM)) modes in some embodiments.

In a further aspect of the invention for which protection is sought there is provided a method of operating a motor vehicle driveline comprising causing by means of control means a torque transmission path from prime mover means to be connected to first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation, the method comprising connecting the second group to the torque transmission path by means of an auxiliary portion of the driveline, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels, when the driveline is in the first mode the method comprising causing the driveline to transition to the second mode when one or more trigger conditions in respect of one or more vehicle operating parameters is met, the one or more trigger conditions being determined at least in part in dependence on a speed value corresponding to vehicle speed.

In an aspect of the invention for which protection is sought there is provided a motor vehicle driveline having:
at least first and second groups of one or more wheels; and control means,
the driveline being operable by means of the control means to connect a torque transmission path from prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the driveline being operable to connect the second group to the torque transmission path by means of an auxiliary portion thereof, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels,
when the driveline is in the first mode the control means being operable to cause the driveline to transition to the second mode when one or more trigger conditions in respect of one or more vehicle operating parameters is met, the one or more trigger conditions being determined at least in part in dependence on a speed value corresponding to vehicle speed.

In an aspect of the invention for which protection is sought there is provided a motor vehicle driveline having:
at least first and second groups of one or more wheels; and control means,
the driveline being operable by means of the control means to connect a torque transmission path from the prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation, the driveline being operable to connect the second group to the torque transmission path by means of an auxiliary portion thereof, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels, when the driveline is in the first mode the control means being operable to cause the driveline to transition to the second mode when one or more trigger conditions in respect of one or more vehicle operating parameters is met, the one or more trigger conditions being determined at least in part in dependence on vehicle speed, a speed of the driveline or a speed of a powertrain, the powertrain including the driveline and the prime mover means.

In one aspect of the invention for which protection is sought there is provided a method of operating a motor vehicle driveline comprising causing by means of control means a torque transmission path from prime mover means to be connected to first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation, the method comprising connecting the second group to the torque transmission path by means of an auxiliary portion of the driveline, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels, when the driveline is in the first mode the method comprising causing the driveline to transition to the second mode when one or more trigger conditions in respect of one or more vehicle operating parameters is met, the one or more trigger conditions being determined at least in part in dependence on vehicle speed, a speed of the driveline or a speed of a powertrain, the powertrain including the driveline and the prime mover means.

In a further aspect of the invention for which protection is sought there is provided a motor vehicle driveline having:
at least first and second groups of one or more wheels; and control means, the driveline being operable by means of the control means to connect a torque transmission path from the prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation, the driveline being operable to connect the second group to the torque transmission path by means of an auxiliary portion thereof, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels, the control means being operable to control the vehicle to operate in a selected one of a plurality of driving modes in each of which one or more vehicle sub-systems are operated in a prescribed one of a plurality of respective configurations, the set of one or more trigger conditions being determined at least in part in dependence on the selected driving mode.

In an aspect of the invention for which protection is sought there is provided a motor vehicle having a driveline comprising at least first and second groups of one or more wheels, and control means, the driveline being operable by means of the control means to connect a torque transmission path from the prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation, the driveline being operable to connect the second group to the torque transmission path by means of an auxiliary portion thereof, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels, the control means being operable to control the vehicle to operate in a selected one of a plurality of driving modes in each of which one or more vehicle sub-systems are operated in a prescribed one of a plurality of respective configurations, the control means being operable to cause the driveline to operate in one of the first or second modes in dependence at least in part on the selected driving mode.

Thus if the vehicle is operating in a driving mode in which the second mode of operation of the driveline is not permanently required and the vehicle is subsequently operated in a driving mode in which the second mode of operation of the driveline is permanently required (such as an off-road mode) the driveline may be configured automatically to assume the second mode of operation when the driving mode changes. Similarly, the driveline may be configured to assume the first mode when the vehicle is operated in a prescribed one or more driving modes in which operation of the vehicle in the first mode only is mandated.

In a further aspect of the invention for which protection is sought there is provided a motor vehicle driveline having:
at least first and second groups of one or more wheels; and control means, the driveline being operable by means of the control means automatically to connect a torque transmission path from the prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation, the driveline being operable in an economy-oriented mode and a performance oriented mode, when the driveline is operated in the economy-oriented mode the control means being configured to cause the driveline to remain in the first mode.

The control means may be operable wherein the driveline is operated in the performance oriented mode to cause the driveline to operate in the second mode and not in the first mode.

The driveline may be operable in a general mode in which the control means is configured automatically to cause the driveline to assume the second mode in dependence at least in part on the value of one or more parameters associated with a vehicle.

The driveline may be operable to connect the second group of one or more wheels to the torque transmission path by means of an auxiliary portion thereof, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels.

In one aspect of the invention for which protection is sought there is provided a motor vehicle having a driveline comprising at least first and second groups of one or more wheels, and control means, the driveline being operable by means of the control means to connect a torque transmission path from the prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation, the driveline being operable to connect the second group to the torque transmission path by means of an auxiliary portion thereof, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels, the vehicle being operable to provide a visual indication to a user of the instant mode in which the driveline is operating.

At least one of the first and second releasable torque transmitting means may comprise clutch means operable to vary an amount of torque transmitted thereby under the control of the control means, the vehicle being arranged to provide a visual indication to a user of the amount of torque that may be transmitted by one or both of the releasable torque transmitting means at a given moment in time.

Optionally, at least one of the first and second releasable torque transmitting means comprises at least one friction clutch.

The friction clutch may be a hydraulically actuated friction clutch, wherein the instant amount of torque that may be transmitted by the friction clutch is determined by the vehicle at least in part in dependence on a hydraulic fluid pressure.

Alternatively the friction clutch may be an electrically actuated friction clutch, wherein the instant amount of torque that may be transmitted by the friction clutch is determined by the vehicle at least in part in dependence on a signal indicative of the amount of electrical power consumed by an actuator of the clutch.

The signal indicative of the amount of electrical power may be a signal indicative of the amount of current drawn by the actuator, an electrical potential applied to the actuator and/or one or more other signals.

BRIEF DESCRIPTION OF THE DRAWINGS

Embodiments of the invention will now be described with reference to the accompanying figures in which:

FIG. 9 shows a table indicating the status of a driveline of a vehicle according to an embodiment of the invention as a function of selected driving mode;

FIG. 10 shows a table indicating examples of threshold values of six vehicle parameters above which a transition to a four wheel drive mode may be forced as a function of driving mode;

FIG. 11 shows a table indicating relative rates at which an auxiliary portion of a driveline of a vehicle according to an embodiment of the present invention is caused to connect a second set of wheels to an engine of the vehicle in addition to a first set of wheels—the standard rates correspond to 'comfort' rates (as applied in the case of the parameters indicated to in FIGS. 3, 4 and 6) optimised for reduced NVH whilst the high rates correspond to 'fast' connect rates (as applied in the case of the parameter indicated in FIG. 2);

FIG. 12 shows a table indicating the status of each of ten parameter evaluators as a function of driving mode;

DETAILED DESCRIPTION

Figure 1:
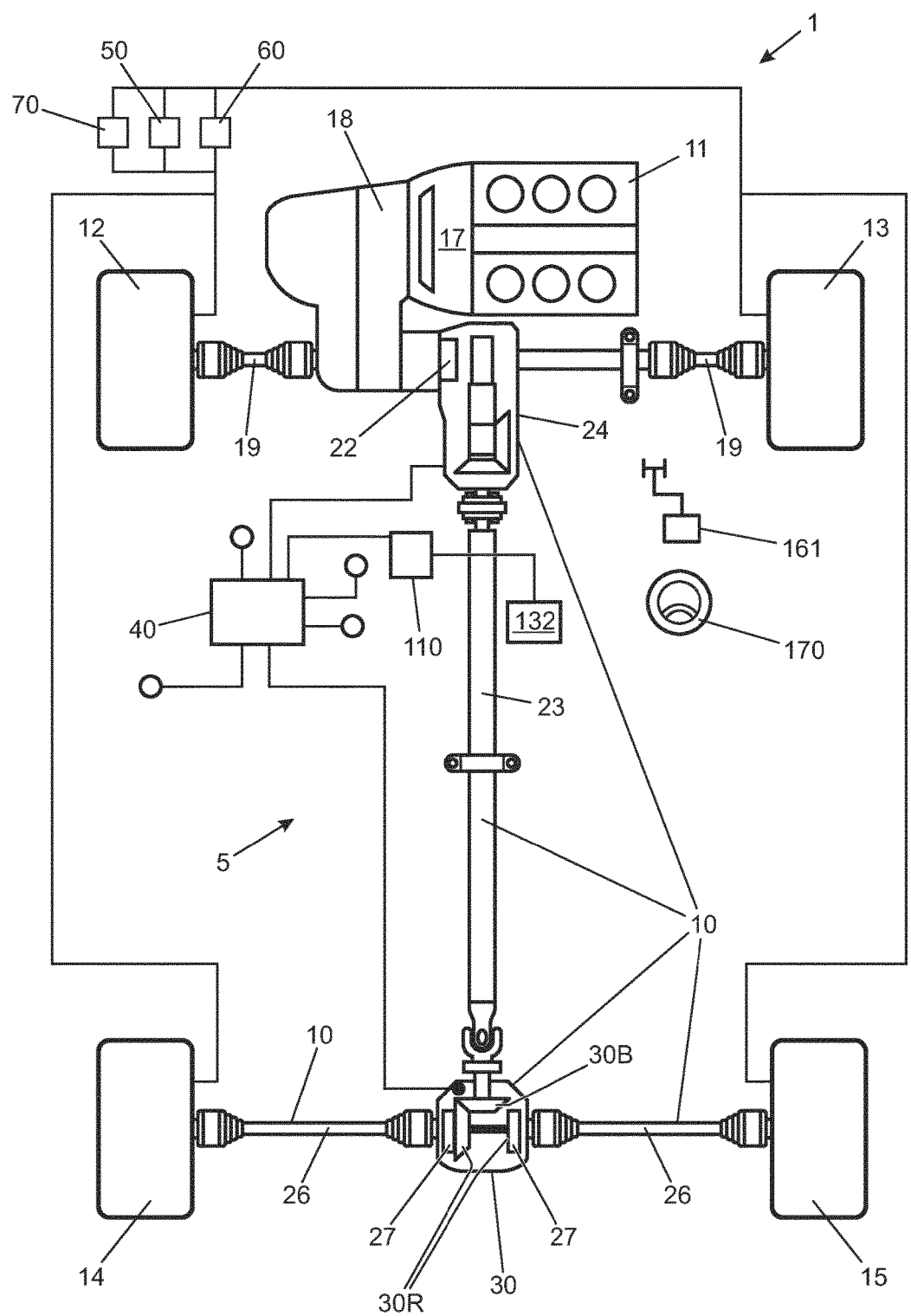
FIG. 1 is a schematic illustration of a vehicle according to an embodiment of the present invention.

A driveline 5 of a motor vehicle 1 according to an embodiment of the present invention is illustrated schematically in FIG. 1. The driveline 5 is connected to a prime mover in the form of an internal combustion engine 11 by means of a gear box 18, and has a pair of front wheels 12, 13, an auxiliary portion 10 and a pair of rear wheels 14, 15.

The driveline 5 is arranged selectively to transmit power supplied to it by the gearbox 18 from the internal combustion engine 11 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 to the front wheels 12, 13 by means of a clutch 17, a gearbox 18 and a pair of front drive shafts 19.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft or prop shaft 23 of the auxiliary portion 10 to the gearbox 18. In the embodiment of FIG. 1 the PTC 22 is a multi-plate wet clutch. Other types of clutch may be useful in some embodiments such as a dog clutch. A synchroniser device may be employed to synchronise the speed of rotation of input and output portions of the PTC 22 in some embodiments. The prop shaft 23 is coupled in turn to a rear drive unit (RDU) 30 operable to couple the prop shaft 23 to the rear drive shafts 26.

The RDU 30 has a pair of clutches 27 having input portions driven by ring gear 30R which is in turn driven by bevel gear 30B. Bevel gear 30B is driven by the prop shaft 23. The clutches 27 enable the RDU 30 to connect the prop shaft 23 to the rear drive shafts 26 when the four wheel drive mode of operation is required. The clutches 27 of the RDU 30 are also multi-plate wet clutches in the embodiment of FIG. 1.

The driveline 5 has a controller 40 arranged to control operation of the PTU 24 and clutches 27. When a four wheel drive mode of operation is required the controller 40 is arranged to close the PTC 22 and to close clutches 27 of the RDU 30. Since the driveline 5 forms part of a powertrain, which includes the engine 11 and gearbox 18, the controller 40 may in some embodiments control the engine 11 and optionally the gearbox 18 in addition to the driveline 5 and be referred to as a powertrain controller. The controller 40 may be arranged to attempt to cause the engine 11 to develop a required amount of torque and/or to rotate at a required speed in some embodiments. The required amount of torque may be determined according to a position of an accelerator pedal or by reference to an automatic speed control system such as a cruise control system.

In the embodiment of FIG. 1 the PTC 22 and differential clutches 27 have respective actuators operable to close the respective clutches 27 at a selected one of a plurality of different rates. This allows the transition from the two wheel drive mode of operation to the four wheel drive mode of operation to be made at one of a corresponding plurality of different rates. It is to be understood that, in the case of a friction clutch, as the clutch is closed, a maximum amount of torque that the clutch is able to transmit from an input to an output thereof increases to a maximum transfer torque value associated with the closed condition. In the case of a multi-plate wet clutch the maximum amount of torque the clutch can transmit may be responsive at least in part to an amount of pressure applied to the plates of the clutch.

It is to be understood that the rate at which the respective actuators actuate the respective clutch arrangements may affect a rate of wear of the clutches and potentially one or more other components of the driveline 5. The rate of actuation may also impact the level of NVH (noise, vibration and harshness) experienced by a driver or passenger of a vehicle.

Recognising this, the present inventors have realised that in some circumstances it is desirable to actuate the clutches 27 of the differential 30 and/or the PTC 22 at a reduced rate in order to reduce a rate at which the rear wheels 14, 15 and/or gearbox are connected to the prop shaft 23. This can reduce a rate of wear of components of the driveline 5 and reduce NVH associated with a transition from the first mode to the second mode.

The controller 40 of the driveline 5 is arranged to control the auxiliary portion 10 such that slower rates of actuation of the PTC 22 and clutches 27 are employed when a requirement to assume the four wheel drive mode of operation of the driveline 5 is less urgent and higher rates of actuation are employed when the requirement to assume the four wheel drive mode is more urgent.

It is to be understood that in the present embodiment the controller 40 is operable to control the driveline 5 to assume the four wheel drive mode responsive to a selection of a required vehicle driving mode by a driver, or automatically, in response to a value of one or more vehicle operating parameters. Thus, in the event the controller 40 detects that an amount of wheel slip exceeds a prescribed value, the controller may control the driveline 5 automatically to assume four wheel drive mode. It is to be understood that a transition to four wheel drive driveline mode may be more urgent in some situations where the controller 40 determines automatically that the four wheel drive mode is required, compared with other situations where a requirement to assume four wheel drive mode is in response to (say) driver selection of a particular vehicle driving mode. It is to be understood that in driving modes other than the highway driving mode ('SPO' driving mode), in the present embodiment the controller 40 is configured automatically to cause the driveline 5 to operate in the four wheel drive mode and not the two wheel drive mode although other arrangements may be useful in some alternative embodiments.

Figure 2:
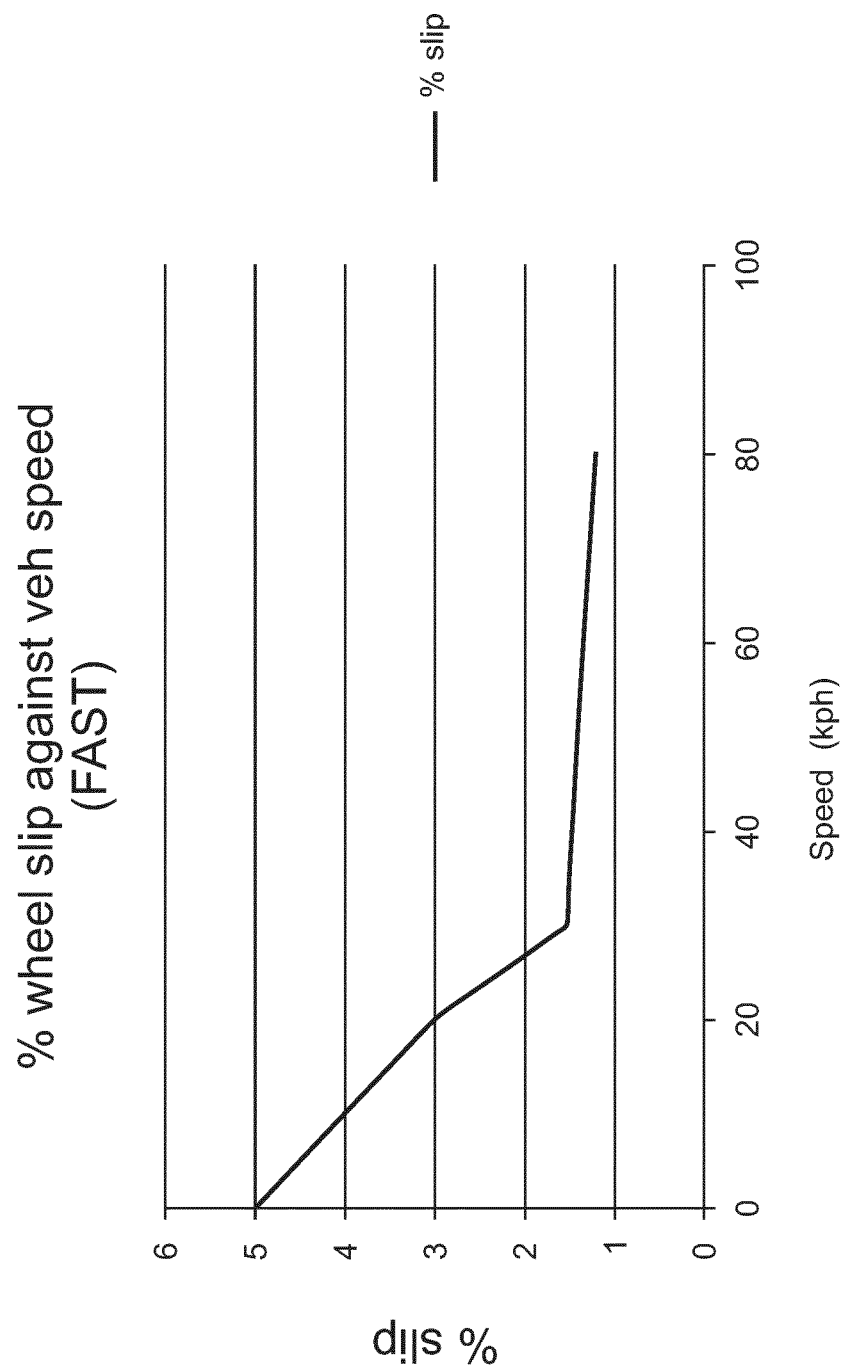
FIG. 2 is a plot of values of percentage wheel slip above which a driveline transitions from a two wheel drive mode to a four wheel drive mode as a function of vehicle speed in a vehicle according to an embodiment of the present invention.

In the present embodiment, when the driveline 5 is operating in the two wheel drive mode the controller 40 is arranged to cause the driveline 5 to assume the four wheel drive mode from the two wheel drive mode when wheel slip exceeds a prescribed threshold value, which is a function of vehicle speed as shown in FIG. 2. It can be seen that the threshold value decreases with increasing vehicle speed. In the present embodiment, the controller 40 causes the driveline 5 to assume the four wheel drive mode at a relatively rapid rate when a transition to the four wheel drive mode is made in response to wheel slip.

Figure 3:
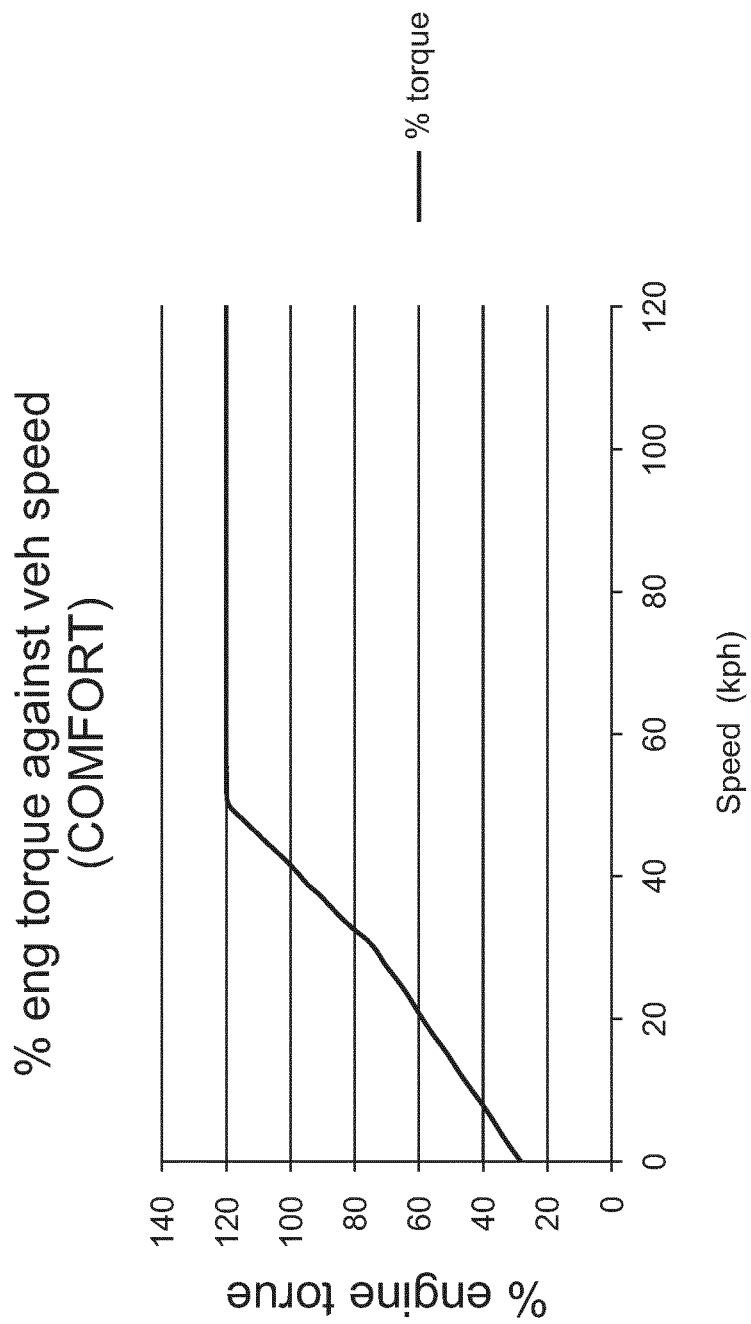
FIG. 3 is a plot of values of engine torque above which a driveline transitions from a two wheel drive mode to a four wheel drive mode as a function of vehicle speed in a vehicle according to an embodiment of the present invention.

The controller 40 is also arranged to cause the driveline 5 to assume the four wheel drive mode from the two wheel drive mode when the amount of torque developed by the engine 11 exceeds a prescribed threshold value. The threshold value is a function of vehicle speed as shown in FIG. 3. It can be seen that the threshold value increases with increasing engine torque until the vehicle reaches a speed of 50 kph. When the threshold value exceeds 100% engine torque, the connect feature is effectively disabled since it is not possible for engine torque to exceed the maximum attainable engine torque. The driveline 5 therefore does not transition from the two wheel drive mode to the four wheel drive mode in response to engine torque at speeds where the threshold value exceeds 100% engine torque. In the present embodiment, the controller 40 causes the driveline 5 to assume the four wheel drive mode at a slower rate when a transition to the four wheel drive mode is made in response to engine torque, compared with that in response to wheel slip.

In some embodiments, driveline torque may be taken into account in the driveline connect strategy. By driveline torque is meant the amount of torque at a given position of the driveline 5 and may be determined by way of example by reference to engine output shaft torque and a gear ratio between the engine output shaft and the given position of the driveline 5. This value of torque may be used in addition to or instead of engine output torque in order to determine when a transition from two wheel drive to four wheel drive modes should be commanded.

Figure 4:
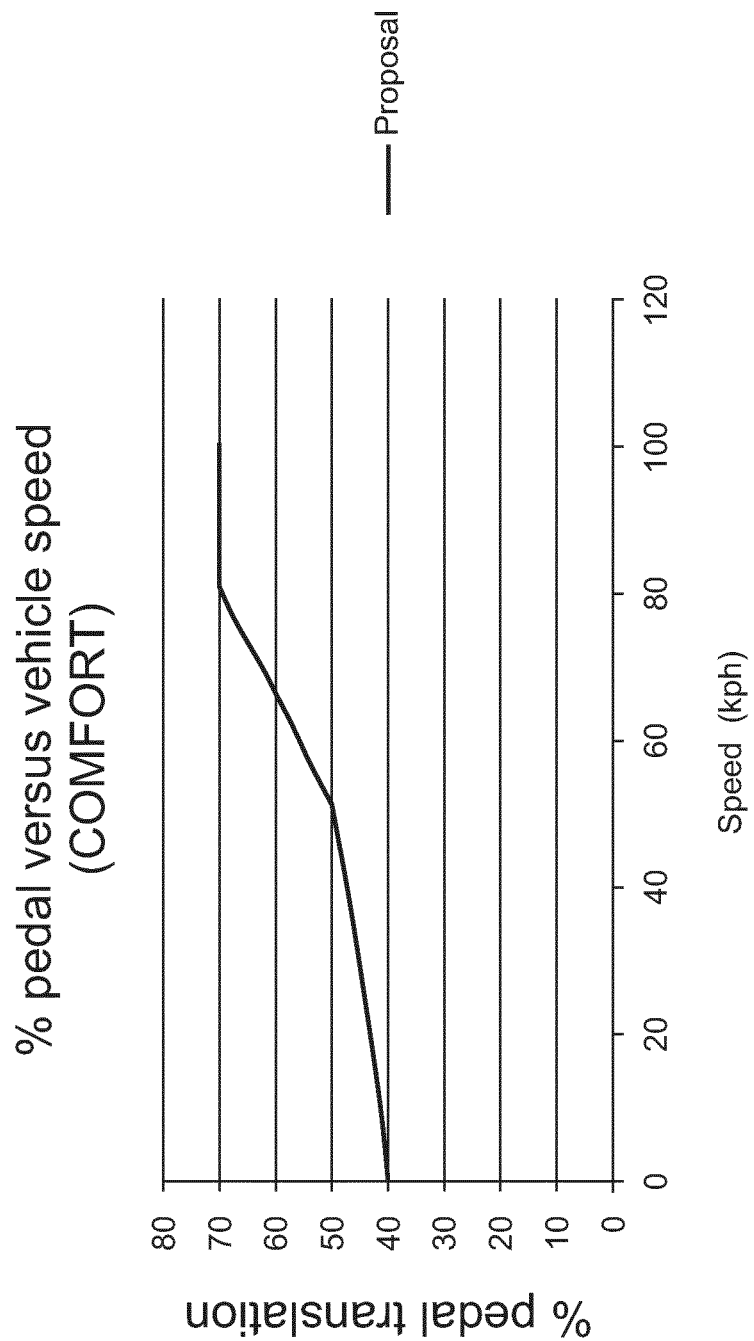
FIG. 4 is a plot of values of accelerator pedal position above which a driveline transitions from a two wheel drive mode to a four wheel drive mode as a function of vehicle speed in a vehicle according to an embodiment of the present invention.

It is to be understood that the relatively slow rate of connection of the auxiliary portion 10 of the driveline 5, favours lower NVH and reduced wear of the driveline 5. The controller 40 is also arranged to cause the driveline 5 to assume the four wheel drive mode from the two wheel drive mode when the amount by which an accelerator pedal 161 is depressed exceeds a prescribed threshold value, in the present embodiment a prescribed percentage of full scale depression of the pedal 161. The threshold value is a function of vehicle speed as shown in FIG. 4. It can be seen that in the present embodiment the threshold value increases with increasing depression of the accelerator pedal 161 to a value of 70% when the vehicle reaches a speed of 80 kph. At and above this speed, the threshold value remains substantially 70%, i.e. the driveline 5 assumes the four wheel drive mode when in the two wheel drive mode when the deflection of the pedal 161 exceeds 70%. Other values of percentage deflection are also useful. When a transition to the four wheel drive mode is made in response to the accelerator pedal position value exceeding the value prescribed by FIG. 4, the transition is made at a relatively slow rate compared with that in response to wheel slip.

Figure 5:
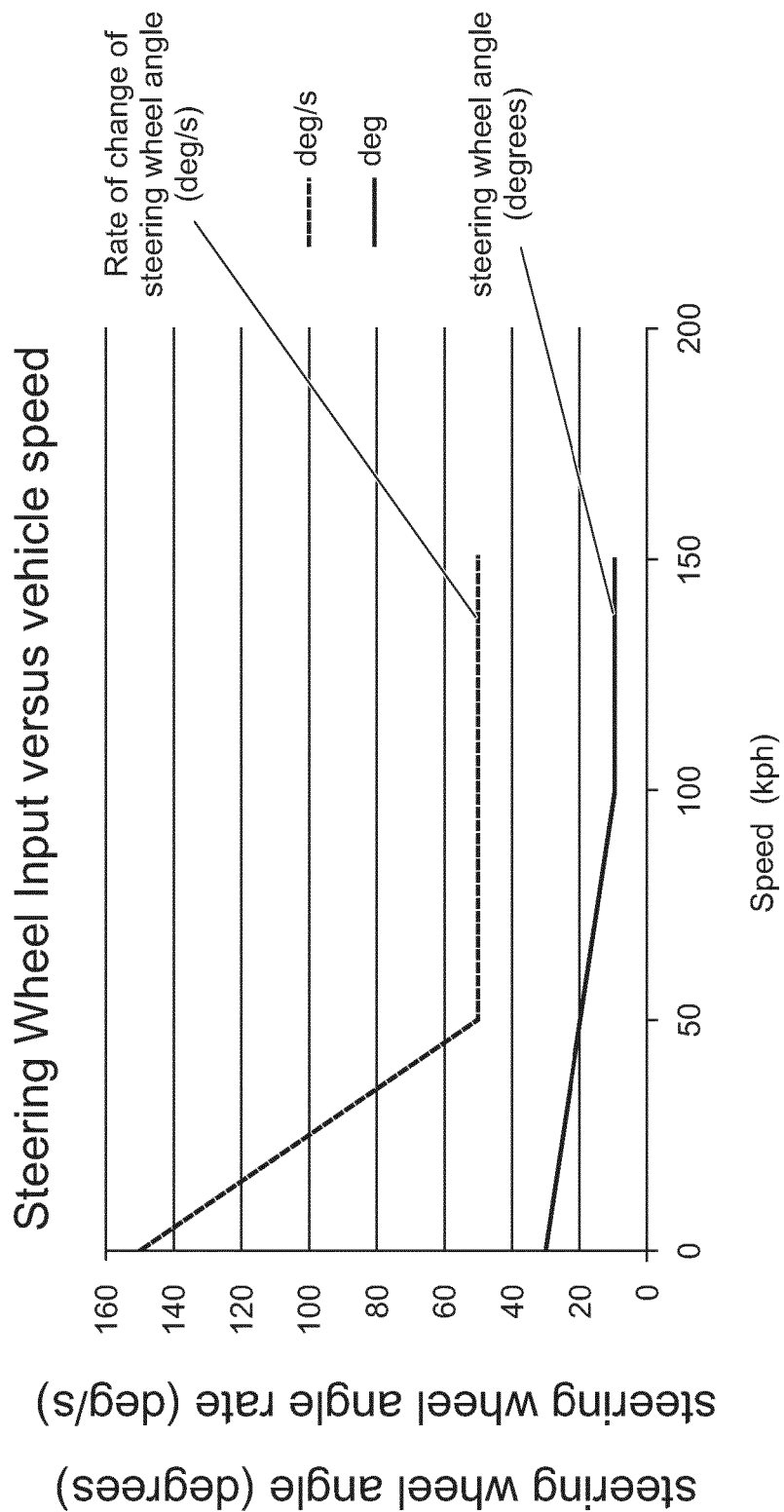
FIG. 5 is a plot of values of steering wheel angle and rate of change of steering wheel angle as a function of vehicle speed, wherein when steering wheel angle and rate of change of steering wheel angle each exceed the values shown for a given vehicle speed the driveline is configured to assume the second mode of operation if the driveline is in the first mode.

The controller 40 is also arranged to cause the driveline 5 to assume the four wheel drive mode from the two wheel drive mode when (1) an instant angle of a steering wheel 170 of the vehicle 1 with respect to a straight-ahead position exceeds a prescribed threshold value; (2) at substantially the same time, a rate of change of steering wheel angle exceeds a prescribed rate; and (3) the vehicle is travelling above a prescribed speed. In the present embodiment the prescribed speed is 20 kph although other values are also useful in some embodiments. The threshold values of steering wheel angle and rate of change of steering wheel angle are each a function of vehicle speed as shown in FIG. 5.

It can be seen that in the present embodiment the threshold value of rate of change of steering wheel angle decreases with increasing vehicle speed until vehicle speed reaches 50 kph, above which speed the threshold angle remains substantially constant. The threshold value of steering wheel angle decreases with vehicle speed until the vehicle speed reaches 100 kph, above which speed the threshold value remains substantially constant.

When a transition to the four wheel drive mode is made in response to the accelerator pedal position value exceeding the value prescribed by FIG. 4, the transition is made at a relatively rapid rate for vehicle speeds above a prescribed threshold. In the present embodiment the threshold value is 80 kph. The rate employed is similar to the rate employed when a transition to the four wheel drive mode is made in response to wheel slip, i.e. the fastest allowable rate. At speeds below 80 kph, the transition to four wheel drive mode in response to accelerator pedal position is made at a lower rate appropriate to relatively low NVH and increased passenger comfort. This feature has the advantage that a reduced time to assume the four wheel drive mode may be enjoyed at relatively high speeds where NVH associated with the transition to the four wheel drive mode may be more effectively masked by NVH associated with vehicle speed. Furthermore, the benefit of travel in the four wheel drive mode may be enjoyed more quickly at higher speeds, enhancing vehicle composure.

Figure 6:
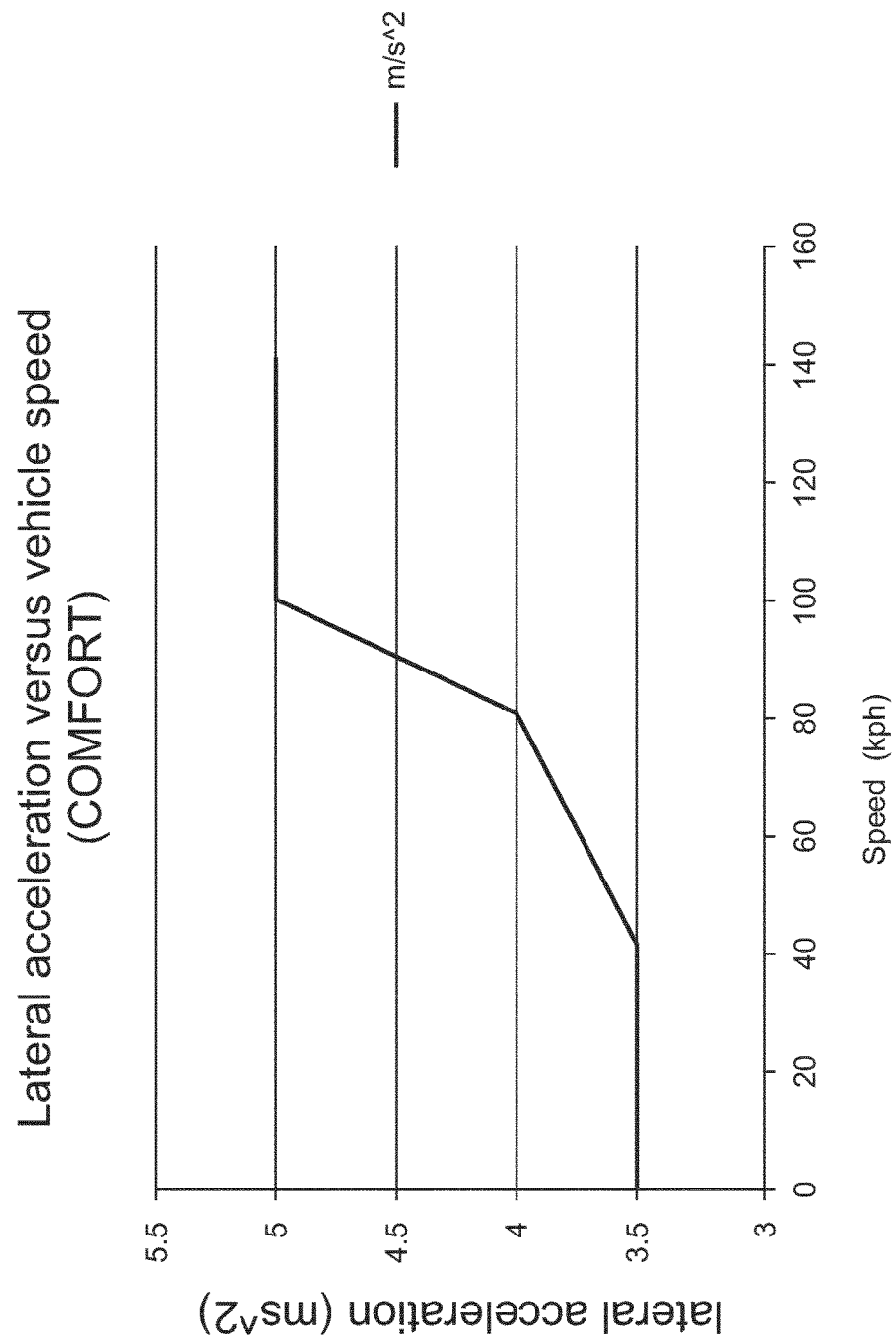
FIG. 6 is a plot of values of vehicle lateral acceleration above which a driveline transitions from a two wheel drive mode to a four wheel drive mode as a function of vehicle speed in a vehicle according to an embodiment of the present invention.

The controller 40 is also arranged to cause the driveline 5 to assume the four wheel drive mode from the two wheel drive mode when a value of lateral acceleration of the vehicle 1 exceeds a prescribed threshold value. The threshold value is a function of vehicle speed as shown in FIG. 6. It can be seen from FIG. 6 that, in the present embodiment, the threshold value of lateral acceleration is substantially constant as a function of vehicle speed below a speed of 40 kph. The threshold value increases at a first rate as speed increases from 40 kph to 80 kph, and at a second rate higher than the first as speed increases from 80 kph to 100 kph. Above 100 kph, the threshold value remains substantially constant. In the embodiment of FIG. 1 the first rate is a rate of substantially $0.0125$ ms$^{-2}$ and the second rate is a rate of substantially $0.05$ ms$^{-2}$ although other values of first and/or second rate may be useful in some embodiments.

Figure 7:
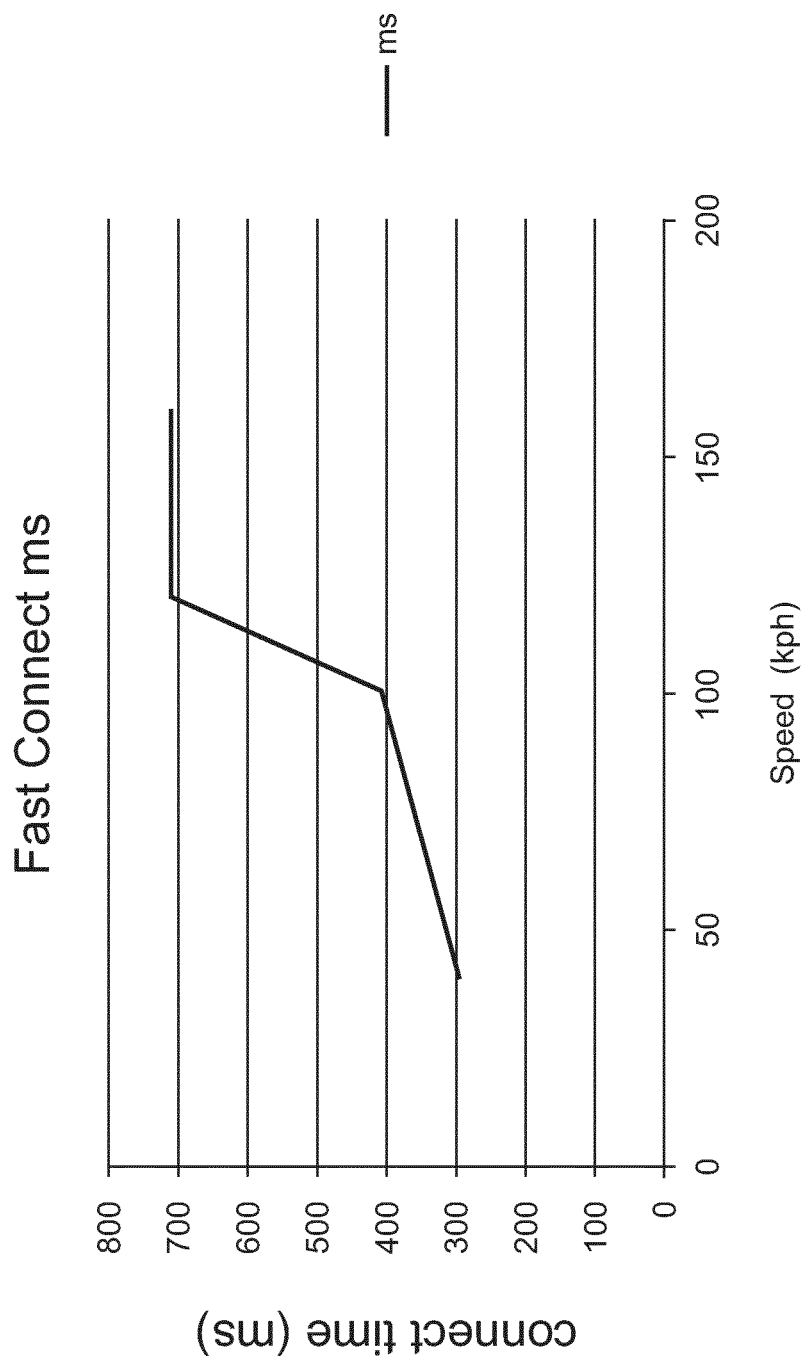
FIG. 7 is a plot of connect time as a function of vehicle speed in a vehicle according to an embodiment of the present invention in a driveline according to an embodiment of the present invention.

The controller 40 is also arranged such that the time period over which the driveline 5 is caused to assume the four wheel drive mode from the two wheel drive mode in response to wheel slip or steering wheel input increases with increasing vehicle speed as shown in FIG. 7. The rate of increase of the time period over which the transition takes place increases abruptly above 100 kph and saturates at speeds at and above around 120 kph. Other forms of variation of connect rate with speed are also useful. The connect time may decrease with increasing vehicle speed in some alternative embodiments.

In the present embodiment, the controller 40 is configured such that the driveline 5 is commanded to assume the four wheel drive mode if the vehicle is in the two wheel drive mode and the vehicle speed falls below 12 kph. Other threshold speeds are also useful such as 10 kph or any other suitable value. Once the driveline 5 is in the four wheel drive mode as a consequence of travel below this speed, the driveline 5 remains in the four wheel drive mode until the vehicle speeds exceeds 35 kph. Again, other values of speed are also useful.

Furthermore, in some embodiments if an amount of lateral acceleration of the vehicle 1 exceeds a prescribed value, the driveline 5 is configured to remain in the four wheel drive mode. That is, the driveline 5 will not be caused to assume the two wheel drive mode whilst lateral acceleration exceeds this value. In the present embodiment the prescribed value is substantially 2 ms−2. Other values are also useful.

In some embodiments, the controller 40 is configured not to permit the driveline to transition from the four wheel drive mode to the two wheel drive mode within 5 s of causing a transition to the four wheel drive mode from the two wheel drive mode. This period may be referred to as a disconnect delay period.

In some embodiments the controller 40 may be operable to vary the amount of torque coupling between input and output portions of the clutches 27 of the RDU 30. That is, the amount or torque from the prop shaft 23 that may be coupled to the rear axles 26 may be varied. This may be achieved in the present embodiment by varying the amount of pressure urging clutch plates of the clutches 27 together. The amount of coupling may be varied in dependence on one or more parameters. For example in some embodiments the amount of pressure may be increased at higher rates of vehicle longitudinal and/or lateral acceleration compared to lower rates of acceleration.

In the present embodiment, if the amount of clutch pressure exceeds a prescribed proportion of the maximum permissible pressure as a consequence of the value of the one or more parameters noted above such as rate of longitudinal and/or lateral acceleration, the controller 40 may be arranged not to permit a transition from the four wheel drive mode to the two wheel drive mode. In the present embodiment the prescribed proportion is 10%. Other values are also useful. Thus it is to be understood that, if the clutch pressure is greater than the prescribed proportion because the clutches 27 are being employed to transmit torque, the driveline 5 may be caused to remain in the four wheel drive configuration. In some embodiments this feature may be considered to provide a software interlock functionality, ensuring that the driveline 5 does not transition to the two wheel drive configuration whilst torque is still being delivered to the rear wheels 14, 15. This may be particularly useful in scenarios where different conditions or thresholds are used to trigger transitions to and from the four wheel drive configuration, and to determine the clutch pressure causing the clutches 27 of the RDU 30 to remain closed. This feature may prevent a transition to the two wheel drive configuration when transfer of driveline torque by the clutches 27 is providing a useful enhancement in vehicle performance such as whilst cornering or accelerating whilst travelling in a relatively straight path.

In the present embodiment, the controller 40 is also configured to cause the driveline 5 to assume the four wheel drive mode if the ambient temperature falls below a prescribed value. In the present embodiment the prescribed temperature is −10 Celsius although other values are also useful.

Furthermore, in the present embodiment if the vehicle 1 is started from a key-off condition in which the engine 1 is switched off, the controller 40 is configured to cause the driveline 5 to remain in the four wheel drive mode until the vehicle 1 has travelled 2 km. If the speed of the vehicle 1 has exceeded 50 kph at any point over this distance, the controller 40 causes the driveline 5 to assume the two wheel drive mode once the distance of 2 km has been travelled unless a condition exists requiring the driveline 5 to remain in the four wheel drive mode. If the vehicle speed has not exceeded 50 kph over this distance, the driveline 5 remains in the four wheel drive mode until the vehicle 1 has travelled a further 2 km. The vehicle 1 then assumes normal operation in which a transition to the two wheel drive mode may occur provided no conditions exist requiring the driveline 5 to remain in the four wheel drive mode.

The vehicle 1 is provided with an antilock braking system (ABS) module 50 arranged to control a brake of one or more wheels of the vehicle 1 to reduce an amount of braking action when required in order to prevent skidding. The vehicle 1 also has a dynamic stability control system (DSC) 60 arranged to control an amount of torque delivered to one or more wheels of the vehicle to prevent wheel slip.

Furthermore, the vehicle 1 may have a traction control system (TCS) 70 arranged to monitor wheels of the vehicle 1 and to apply a brake to a wheel in the event that it is determined that the wheel is rotating at a speed that is higher than that required for substantially no wheel slip to occur.

In some embodiments the controller 40 is arranged to determine whether a transition to the four wheel drive mode may be required responsive to a history of a driving style of a driver of the vehicle 1. Thus if the controller 40 determines that wheel-spin is occurring frequently when the vehicle 1 first launches from a stationary condition, the controller 40 may be arranged to control the driveline 5 automatically to assume the four wheel drive mode of operation when the vehicle is stationary. The controller 40 may be arranged to consider the history of the driving style of the user over a prescribed historical time period or a prescribed number of previous drivecycles. Other arrangements are also useful.

Similarly, the controller 40 may determine that an amount of lateral acceleration of the vehicle 1 is fluctuating repeatedly between relatively high values and relatively low values. Such fluctuations may suggest for example that the vehicle 1 is negotiating a winding road. The controller 40 may therefore control the vehicle 1 to assume the four wheel drive mode on the basis that an increased probability exists that the controller 40 will be required to trigger a transition to the four wheel drive mode of operation.

The historical time period may be a period of the order of a few seconds, a few minutes, a few tens of minutes, a few hours, a few days, a few weeks or any other suitable period of time. The length of the historical time period employed may also be responsive to the particular operating parameter(s) under consideration.

Figure 8:
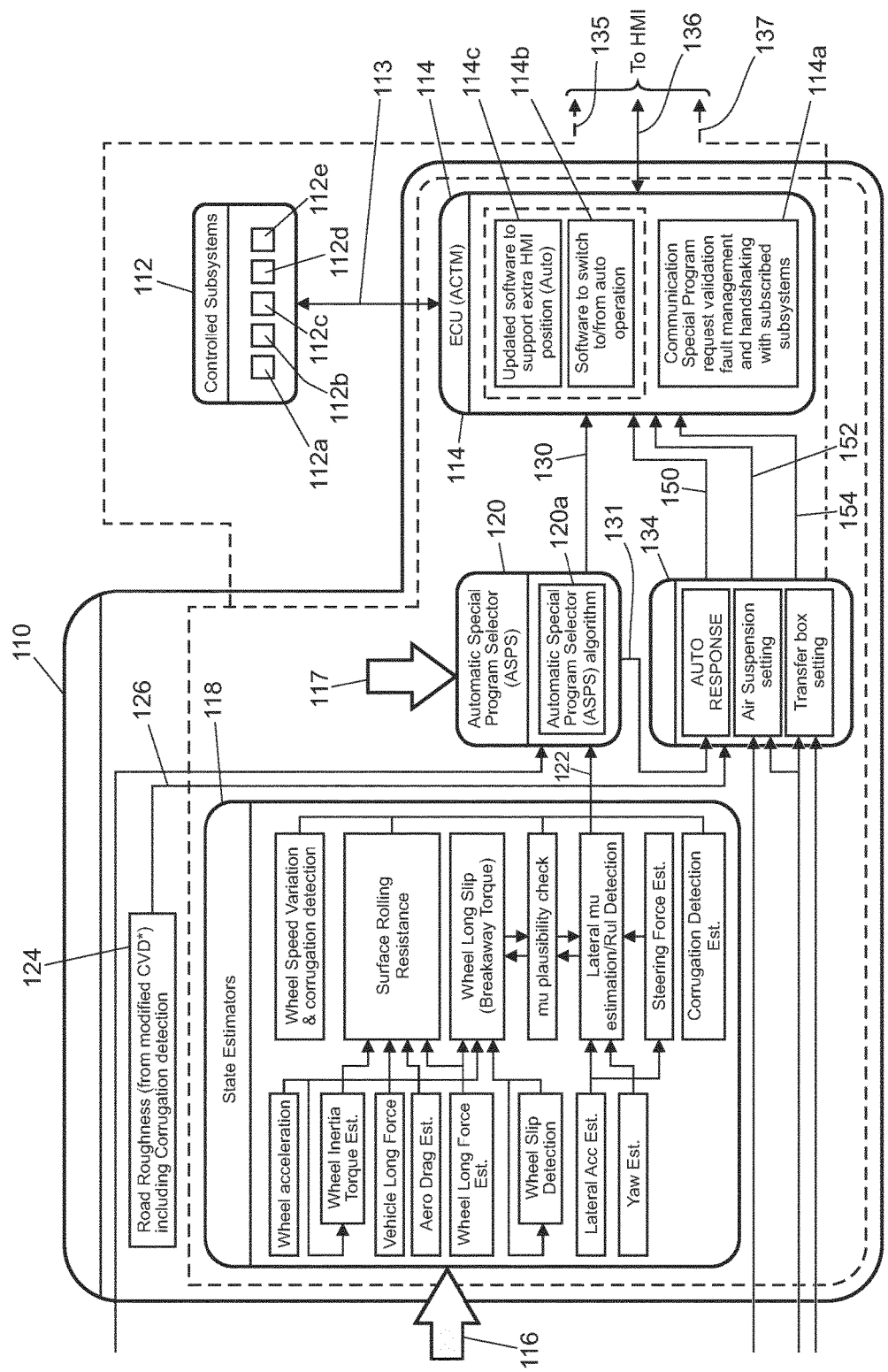
FIG. 8 is a schematic illustration of a portion of a control system of a vehicle according to an embodiment of the present invention responsible for causing the vehicle to operate in a particular driving mode.

The vehicle 1 of FIG. 1 has a vehicle control unit (VCU) 110. FIG. 8 shows the VCU 110 in more detail. The VCU 110 is operable to control a plurality of vehicle subsystems 112 including, but not limited to, an engine management system 112a, a transmission system 112b, an electronic power assisted steering unit 112c (ePAS unit), a brakes system 112d and a suspension system 1112e. Although five subsystems are illustrated as being under the control of the VCU 110, in practice a greater number of vehicle subsystems may be included on the vehicle and may be under the control of the VCU 110. The VCU 110 includes a subsystem control module 114 which provides control signals via line 113 to each of the vehicle subsystems 112 to initiate control of the subsystems in a manner appropriate to the driving condition, such as the terrain or driving surface, in which the vehicle is travelling (referred to as the terrain condition). The subsystems 112 also communicate with the subsystems control module 114 via signal line 113 to feedback information on subsystem status.

The VCU 110 receives a plurality of signals, represented generally at 116 and 117, which are received from a plurality of vehicle sensors and are representative of a variety of different parameters associated with vehicle motion and status. As described in further detail below, the signals 116, 117 provide, or are used to calculate, a plurality of driving condition indicators (also referred to as terrain indicators) which are indicative of the nature of the condition in which the vehicle is travelling. One advantageous feature of the invention is that the VCU 110 determines the most appropriate one of a plurality of control modes for the various subsystems on the basis of the terrain indicators, and automatically controls the subsystems accordingly. The control modes will also be referred to herein as driving modes since they correspond to different driving conditions.

The sensors (not shown) on the vehicle include, but are not limited to, sensors which provide continuous sensor outputs 116 to the VCU 110, including wheel speed sensors, an ambient temperature sensor, an atmospheric pressure sensor, tyre pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an accelerator pedal position sensor and longitudinal, lateral, and vertical motion sensors.

In other embodiments, only a selection of the aforementioned sensors may be used. The VCU 110 also receives a signal from the electronic power assisted steering unit (ePAS unit 112c) of the vehicle to indicate the steering force that is applied to the wheels (steering force applied by the driver combined with steering force applied by the ePAS unit 112c).

The vehicle 1 is also provided with a plurality of sensors which provide discrete sensor outputs 117 to the VCU 110, including a cruise control status signal (ON/OFF), a transfer box or PTU status signal 137 (indicating whether a gear ratio of the PTU 24 is set to a HI range or a LO range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), an air suspension status signal (HI/LO), and a Dynamic Stability Control (DSC) signal (ON/OFF). It is to be understood that the SCS and DSC signals each provide an indication as to whether the SCS or DSC systems are currently intervening to cause application of brake torque and/or powertrain torque, as appropriate, to improve vehicle stability.

The VCU 110 includes an evaluation means in the form of an estimator module or processor 118 and a calculation and selection means in the form of a selector module or processor 120. Initially the continuous outputs 116 from the sensors are provided to the estimator module 118 whereas the discrete signals 117 are provided to the selector module 120.

Within a first stage of the estimator module 118, various ones of the sensor outputs 116 are used to derive a number of terrain indicators. In a first stage of the estimator module 118, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to detect yaw, pitch and roll. Other calculations performed within the first stage of the estimator module 118 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw, and lateral vehicle acceleration.

The estimator module 118 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from an SCS ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module 118 also uses the outputs from the wheel speed sensors to determine a wheel speed variation and corrugation detection signal.

On the basis of the windscreen wiper signal (ON/OFF), the estimator module 118 also calculates how long the windscreen wipers have been in an ON state (i.e. a rain duration signal).

The VCU 110 also includes a road roughness module 124 for calculating the terrain roughness based on the air suspension sensors (the ride height sensors) and the wheel accelerometers. A terrain indicator signal in the form of a roughness output signal 126 is output from the road roughness module 124.

The estimates for the wheel longitudinal slip and the lateral friction estimation are compared with one another within the estimator module 118 as a plausibility check.

Calculations for wheel speed variation and corrugation output, the surface rolling resistance estimation, the wheel longitudinal slip and the corrugation detection, together with the friction plausibility check, are output from the estimator module 118 and provide terrain indicator output signals 122, indicative of the nature of the terrain in which the vehicle is travelling, for further processing within the VCU 110.

The terrain indicator signals 122 from the estimator module 118 are provided to the selector module 120 for determining which of a plurality of vehicle subsystem control modes is most appropriate based on the indicators of the type of terrain in which the vehicle is travelling. The most appropriate control mode is determined by analysing the probability that each of the different control modes is appropriate on the basis of the terrain indicator signals 122, 126 from the estimator module 118 and the road roughness module 124.

The vehicle subsystems 112 may be controlled automatically (referred to as the "automatic mode") in response to a control output signal 130 from the selector module 120 and without the need for driver input. Alternatively, the vehicle subsystems 112 may be operated in response to a manual driver input (referred to as "manual mode") via a Human Machine Interface (HMI) module 132. The subsystem controller 114 may itself control the vehicle subsystems 112a-112e directly via the signal line 113, or alternatively each subsystem may be provided with its own associated intermediate controller (not shown in FIG. 8) for providing control of the relevant subsystem 112a-112e. In the latter case the subsystem controller 114 may only control the selection of the most appropriate subsystem control mode for the subsystems 112a-112e, rather than implementing the actual control steps for the subsystems. The or each intermediate controller may in practice form an integral part of the main subsystem controller 114.

When operating in the automatic mode, the selection of the most appropriate subsystem control mode is achieved by means of a three phase process:

(1) for each type of control mode, a calculation is performed of the probability that the control mode is suitable for the terrain over which the vehicle is travelling, based on the terrain indicators;

(2) the integration of "positive differences" between the probability for the current control mode and the other control modes; and (3) the program request to the control module 114 when the integration value exceeds a pre-determined threshold or the current terrain control mode probability is zero.

The specific steps for phases (1), (2) and (3) will now be described in more detail.

In phase (1), the continuous terrain indicator signals in the form of the road surface roughness output 126 and the outputs 122 from the estimator module 118 are provided to the selector module 120. The selector module 120 also receives the discrete terrain indicators 117 directly from various sensors on the vehicle, including the PTU status signal (whether the gear ratio is set to a HI range or a LO range), the DSC status signal, cruise control status (whether the vehicle's cruise control system is ON or OFF), and trailer connect status (whether or not a trailer is connected to the vehicle). Terrain indicator signals indicative of ambient temperature and atmospheric pressure are also provided to the selector module 120.

The selector module 120 is provided with a probability algorithm 120a for calculating the most suitable control mode for the vehicle subsystems based on the discrete terrain indicator signals 117 received directly from the sensors and the continuous terrain indicators 122, 126 calculated by the estimator module 118 and the road surface roughness module 124, respectively.

The control modes (also referred to herein as driving modes as noted above) include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. The SP OFF mode may also be referred to as an 'on-road' or 'on-highway' control mode or driving mode. Many other control modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

For each subsystem control mode, the algorithm 120a within the selector module 120 performs a probability calculation, based on the terrain indicators, to determine a probability that each of the different control modes is appropriate. The selector module 120 includes a tuneable data map which relates the continuous terrain indicators 122, 126 (e.g. vehicle speed, road roughness, steering angle) to a probability that a particular control mode is appropriate. Each probability value typically takes a value of between 0 and 1. So, for example, the vehicle speed calculation may return a probability of 0.7 for the RB mode if the vehicle speed is relatively low, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 117 (e.g. trailer connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different sub system control modes, a combined probability value, Pb, is calculated based on the individual probabilities for that control mode, as described above, as derived from each of the continuous or discrete terrain indicators 117, 122, 126. In the following equation, for each control mode the individual probability as determined for each terrain indicator is represented by a, b, c, d . . . n. The combined probability value, Pb, for each control mode is then calculated as follows:

$$Pb=(a.b.c.d \ldots n)/((a.b.c.d \ldots n)+(1-a).(1-b).(1-c).(1-d) \ldots (1-n))$$

Any number of individual probabilities may be input to the probability algorithm 120a and any one probability value input to the probability algorithm 120a may itself be the output of a combinational probability function.

Once the combined probability value for each control mode has been calculated, the subsystem control program corresponding to the control mode with the highest probability is selected within the selector module 120 and an output signal 130 providing an indication of this is provided to the subsystem control module 114. The benefit of using a combined probability function based on multiple terrain indicators is that certain indicators may make a control mode (e.g. GGS or MR) more or less likely when combined together, compared with basing the selection on just a single terrain indicator alone.

A further control signal 131 from the selector module 120 is provided to a control module 134.

In phase (2), an integration process is implemented continually within the selector module (120) to determine whether it is necessary to change from the current control mode to one of the alternative control modes.

The first step of the integration process is to determine whether there is a positive difference between the combined probability value for each of the alternative control modes compared with the combined probability value for the current control mode.

By way of example, assume the current control mode is GGS with a combined probability value of 0.5. If a combined probability value for the sand control mode is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the selector module 120 determines that the current terrain control mode (for GGS) is to be updated to a new, alternative control mode (in this example, the sand control mode). A control output signal 130 is then output from the selector module 120 to the subsystem control module 114 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. other than sand), reaches the predetermined change threshold before the probability result for the sand control mode, the integration process for the sand control mode is cancelled and reset to zero and the other alternative control mode, with a higher probability difference, is selected.

In the present embodiment, the VCU 110 is also operable to cause the subsystems to assume configurations appropriate to relatively aggressive driving in which relatively high rates of acceleration and deceleration are experienced, and relatively high values of lateral acceleration during cornering. In the present embodiment, this mode configuration of the subsystems is referred to as a dynamic mode. In the dynamic mode, a torque map relating accelerator pedal position and engine output torque is steepened compared with the general or SP OFF driving mode. That is, the amount of engine torque generated for a given accelerator pedal position is greater in the dynamic mode compared with the general mode. In addition, a suspension system of the vehicle 1 is stiffened such that an amount of force required to cause a given amount of travel of a wheel of the vehicle 1 relative to a body of the vehicle 1 is increased. In some embodiments having stop/start functionality in which the engine 11 is arranged to be switched off when the vehicle is stationary and automatically to restart when the accelerator pedal 161 is depressed, the VCU 110 may be arranged to suspend stop/start functionality when the vehicle is operated in the dynamic mode.

The VCU 110 is also operable to cause the vehicle 1 to assume an eco mode in which the subsystems assume configurations appropriate to economy-oriented driving. In the eco mode, stop-start functionality is enabled in the present embodiment, and an accelerator pedal/torque demand map is softened relative to the dynamic mode such that the amount of engine torque delivered for a given accelerator pedal position is reduced relative to the dynamic and SP OFF driving modes. In the present embodiment the suspension of the vehicle 1 is set to a stiffness corresponding to that of the SP OFF driving mode.

FIG. 9 is a table indicting the operational status of the driveline 5 as a function of selected driving mode. It can be seen from FIG. 9 that if the vehicle 1 is in the SP OFF or general (or normal) mode, the driveline controller 40 is configured to cause the vehicle to assume the four wheel drive mode from the two wheel drive mode according to the methodology described above with respect of FIGS. 2 to 8.

As illustrated in FIG. 9, the driveline controller 40 is configured to cause the driveline 5 to assume the two wheel drive mode permanently when the eco driving mode has been selected. In the present embodiment the driveline 5 cannot assume the four wheel drive mode when the eco mode has been selected.

When the vehicle 1 is in the GGS mode or a winter mode optimised for travel over surfaces of relatively low friction, the driveline controller 40 is configured to cause the vehicle to remain permanently in the four wheel drive mode. Similarly, if the vehicle 1 is in the sand or dynamic modes, the driveline 5 remains permanently in the four wheel drive mode.

It is to be understood that in some embodiments the controller 40 may be configured to cause the driveline 5 to remain permanently in the two wheel drive or four wheel drive modes by setting the value of one or more thresholds for the transition out of that mode and into the other of the two modes to a value that will result in substantially permanent operation in the required mode. For example, if the threshold speed for a transition from four wheel drive to two wheel drive mode is set to a speed exceeding that which the vehicle 1 is capable of in a given driving mode, the driveline 5 will remain permanently in the four wheel drive mode when in that driving mode. Similarly, if the threshold value of engine torque for the driveline 5 to assume the four wheel drive mode when the vehicle is in the sand mode is set to a relatively low value such as around 10 Nm, the driveline 5 will almost certainly assume the four wheel drive mode when operating in the sand mode.

In an embodiment, when the vehicle 1 is operating in the SP OFF driving mode and the driveline 5 is in the two wheel drive mode, the controller 40 is operable to cause the driveline 5 to assume the four wheel drive mode when any one of a plurality of vehicle parameters exceeds a prescribed value. FIG. 10 lists examples of parameters in dependence on the value of which the driveline 5 of a vehicle according to an embodiment of the invention may be caused to assume the four wheel drive mode when in the two wheel drive mode, when the vehicle 100 is operating in the SP OFF or normal mode. The parameters include (1) vehicle speed; (2) accelerator pedal position; (3) engine output torque; (4) lateral acceleration; (5) wheel slip; and (6) yaw rate error. By yaw rate error is meant a difference between yaw rate expected for the instant steering angle and actual measured yaw rate. It is to be understood that the quoted values are given by way of example only and other values may be useful in some embodiments.

In some embodiments, the controller 40 is operable to allow the driveline 5 to assume the two wheel drive or four wheel drive modes in dependence on the value of one or more parameters such as parameters (1) to (6) above, when operating in one or more of the driving modes other than the SP OFF (normal) mode. As shown in FIG. 10, the driveline 5 may be switched between two wheel drive and four wheel drive modes in dependence on the value of parameters (1) to (6). In each case, the vehicle is operated in the two wheel drive mode unless the value of any one of parameters (1) to (6) exceeds the value listed in the table. It can be seen for example that in the eco mode the value of wheel slip above which the driveline 5 is caused to assume the four wheel drive mode is 20%, whereas in the case of the normal mode the value is 10%. Other values of one or more of these parameters for a given mode are also useful.

In some embodiments, the value of engine output torque in dependence on which the vehicle transitions to the four wheel drive mode is the actual torque developed by the engine at a given moment in time. In some alternative embodiments the value of engine torque is the amount corresponding to the accelerator pedal position, i.e. driver demanded torque, rather than actual torque developed, which may be different.

FIG. 11 illustrates relative rates at which the driveline 5 transitions from the two wheel drive mode to the four wheel drive mode as a function of vehicle driving mode in an embodiment. It can be seen that in the SP OFF (or 'normal') and eco modes, the driveline 5 assumes the four wheel drive mode at a standard rate. In the present embodiment this rate is such that the transition is complete within a period of approximately 500 ms although other values are also useful. The present applicant has found that for one particular vehicle driveline configuration this time period provides an optimum compromise between drivability, NVH and component wear. However if the vehicle 1 is in the winter, GGS, sand or dynamic modes the driveline 5 is configured to assume the four wheel drive mode at a relatively high rate. In the present embodiment this rate is such that the transition is complete within a period of approximately 300 ms although other values are also useful. The present applicant has found that for the same vehicle driveline configuration this time period provides acceptable dynamic response, albeit with a reduction in NVH performance. It is to be understood that if the connect rate is too slow the driver may notice a step change in handling caused by a transition from two wheel drive to four wheel drive operation part way through a relatively severe manoeuvre.

Evaluators

The controller 140 is configured to implement, in computer program code, a set of evaluators of parameters associated with driveline control.

The controller 140 is configured to implement a vehicle speed evaluator that provides a comparison between current vehicle speed and calibrated speed thresholds. Hysteresis in respect of vehicle speeds triggering a connect operation and a disconnect operation is implemented in order to prevent mode chattering. Optionally two sets of thresholds may be included, one to trigger connection at low speeds e.g. for traction, and a second e.g. to trigger connection at very high speeds for vehicle stability.

A throttle pedal position evaluator is implemented to provide a comparison between current accelerator pedal position (or throttle position) and a calibrated threshold. Different thresholds may be provided for each gear. The evaluator may be inhibited from triggering a connect in some gears if required (e.g. $4^{th}$, 5th and 6th gears).

The evaluator may include a function for varying the requested connect rate according to engine speed. For example, below (say) 3000 rpm or any other suitable value the evaluator may trigger a relatively slow connect. Above 3000 rpm (or other suitable engine speed) the evaluator may trigger a relatively fast connect, as the engine may respond to the torque request more quickly, and the additional engine noise may mask NVH associated with the connect operation.

A powertrain torque evaluator may be implemented that calculates transmission output torque by multiplying engine torque demand (obtained for example by means of a CAN signal from an engine management system, EMS) with transmission torque ratio (obtained for example by means of a CAN signal from a transmission controller) whilst compensating for transmission torque losses. The transmission output torque may be compared with a calibration table containing torque levels that should trigger driveline connection. The calibrated torque levels may be a function of vehicle speed. The torque levels may optionally, in addition or instead, be a function of steering wheel angle. For example, at higher absolute steering wheel angles a lower trigger threshold may be employed to trigger a driveline connect compared with that used when the steering wheel is centred.

A second lookup table may be used for disconnect thresholds, providing hysteresis to prevent mode chattering. Thus, the steering wheel angle to trigger a driveline disconnect may be lower than that required to trigger a driveline connect.

The powertrain torque evaluator may also include a function to vary the requested connect rate according to engine speed. For example, below an engine speed of 3000 rpm the evaluator may trigger a relatively slow connect due to the relatively slow engine response to requests for torque increase when the engine speed is relatively low. Above an engine speed of 3000 rpm the evaluator may trigger a relatively fast connect, as the engine may respond to the torque request faster, and the additional engine noise may mask NVH associated with the driveline connect operation.

A lateral acceleration evaluator may monitor measured lateral acceleration (LatAcc) from vehicle sensors (such as a CAN signal from ABS module 50). The measured value of LatAcc may be compared to a calibrated threshold; if the threshold is exceeded, the evaluator may trigger a connect operation or 'event'. The evaluator may include filtering—thus for example the signal may be required to exceed a threshold value for a minimum period of time (e.g. 300 ms) to prevent noise/minor bumps in a road from triggering a spurious connect event. The evaluator may optionally include two calibrated thresholds—a lower value which triggers a relatively slow connect, and a higher value which triggers a relatively fast connect rate. The calibrated thresholds may optionally be a function of vehicle speed. The evaluator may include different thresholds for disconnection, providing hysteresis to prevent mode chattering in a similar manner to that described above in respect of steering wheel position.

A wheel slip evaluator may be provided that calculates expected individual wheel speeds based on certain parameters e.g. overall vehicle speed (with reference to a CAN bus signal from ABS module 50); vehicle yaw rate (by reference to a CAN bus signal); vehicle geometry (e.g. front and rear track width, wheelbase); and steerable road wheel angle (which may be a function of steering wheel angle and a table of steering rack ratios).

The evaluator may be configured to compare expected wheel speeds to actual measured wheel speeds (for example from wheel speed sensors associated with the ABS module) to determine a wheel speed error. If the absolute error exceeds a calibrated threshold the evaluator may trigger a driveline connect operation. Different threshold values of error may be used for connect and disconnect events, providing hysteresis to prevent mode chattering. The thresholds may be a function of vehicle speed. That is, different levels of slip may be permitted at different speeds.

A yaw error evaluator may be configured to calculate expected yaw rate based on inputs such as steering wheel angle and vehicle speed. The expect rate may be compared with measured yaw rate to calculate the yaw error.

A reverse gear detection evaluator may be provided that monitors status flags from the automatic transmission, or a manual gear selector reverse switch in the event of a manual transmission being employed, indicating reverse gear has been selected.

A hill descent control (HDC) evaluator may be provided that monitors a CAN bus status flag indicating a HDC system is active, the signal optionally being provided by the ABS module 50. In some embodiments the ABS module 50 may host the HDC function.

A low temperature detection evaluator may be provided for determining when low temperature conditions exist. The evaluator may be configured to compare a current measured ambient temperature (by reference to a CAN signal) with calibrated thresholds and implement a hysteresis function in which different threshold values are employed for connect and disconnect events in order to prevent mode chattering. The evaluator may be configured to trigger a connect operation in the event sufficiently low temperature conditions exist.

An SCS activity detection evaluator may be provided for monitoring status flags generated by the ABS module 50 indicating activity from the ABS system, DSC system, or TCS.

FIG. 12 is a table listing the status of ten vehicle parameter evaluators that may be employed in some embodiments of the invention. The parameter evaluators are each configured to monitor a value of a vehicle parameter as a function of time. The controller 40 is configured to cause a transition from the two wheel drive mode to the four wheel drive mode in dependence on an output of each evaluator. In certain driving modes one or more of the evaluators may be disabled, such that a transition from the two wheel drive mode to the four wheel drive mode cannot be triggered by the evaluator. Thus, a transition from the two wheel drive mode to the four wheel drive mode may no longer be triggered by the evaluator in dependence on the value of the corresponding vehicle parameter.

In some embodiments, when a reverse gear is selected the driveline 5 always assumes the four wheel drive (connected) configuration regardless of driving mode. Similarly, if a hill descent control system is operational the four wheel drive mode is assumed regardless of driving mode. It is to be understood that the hill descent control system is a known vehicle system operable to limit vehicle speed to a prescribed set-speed when the vehicle is travelling downhill, by applying a braking system.

The SCS system may be operable to request a transition to the four wheel drive mode of the driveline 5 when required. The controller 40 is configured to obey any such request when made regardless of the selected driving mode.

The table provided in FIG. 12 may be modified in dependence on vehicle configuration at a given moment in time. In some embodiments, the table may be modified if either of the vehicle DSC or TCS systems are disabled. In some embodiments the table may be modified if the driver selects the dynamic mode. Similarly, if the driver employs a paddle control or gear shifter to manually select a gear the table may be modified, in some embodiments.

In some embodiments in the case of a hybrid vehicle the table may be modified in dependence on whether hybrid functionality is enabled or disabled. Similarly, the table may be modified if a vehicle has stop/start functionality in dependence on whether the stop/start functionality is enabled or disabled.

In some embodiments, the vehicle 1 is provided with an HMI (human machine interface) display that provides a visual indication of driveline status. That is, the interface provides a visual indication as to whether the driveline 5 is in the two wheel drive or four wheel drive modes. In some embodiments operable to vary an amount of pressure urging the clutches 27 into the closed condition (thereby to vary the amount of torque coupling across the clutches 27) the HMI may be arranged to provide a visual indication of the amount of torque coupling at a given moment in time. The amount of torque coupling may be determined in dependence on the amount of hydraulic fluid pressure applied to the clutches 27 (in the case of hydraulically actuated clutches) or the amount of electrical current supplied to the clutches in the case of electrically actuated clutches. It is to be understood that the amount of torque coupling may be varied in use such that the driveline 5 may operate with a minimum amount of torque coupling (in the two wheel drive mode), the maximum amount of torque coupling (i.e. maximum force urging the clutches 27 into the closed condition) or a predetermined amount of torque coupling between the maximum and minimum values. In some embodiments the HMI display displays only an indication as to whether or not a clutch is in an operational state allowing torque to be transmitted thereby, i.e. whether an amount of coupling greater than the minimum amount is present. It is to be understood that the minimum amount of coupling may correspond to residual coupling between input and output portions of a given clutch 27 due for example to the presence of hydraulic fluid between plates of the clutches 27 even though pressure urging the plates together has been released or reduced substantially to zero in order to allow the driveline 5 to assume the two wheel drive configuration.

In some embodiments, the controller 40 receives inputs in respect of one or more of:
(a) Wheel speeds
(b) Vehicle speed
(c) Steering angle
(d) Rate of change of steering angle
(e) Engine torque (actual torque generated and/or driver demanded torque)
(f) Accelerator pedal position
(g) Driving (TR) mode
(h) ABS status (whether of not the ABS is intervening to reduce brake force to reduce wheel slip)
(i) Gear selector position or mode (corresponding to the operating mode of an automatic transmission in the case of a vehicle having an automatic transmission, for example 'park', 'neutral', 'reverse' or 'drive' mode)
(j) Calculated or actual clutch temperature
(k) Ambient Temperature (such as outside air temperature)
(l) Engine operating temperature (such as engine oil temperature)
(m) Lateral acceleration
(n) Hill descent control (HDC) status
(o) Traction control (TC) status
(p) Dynamic stability control (DSC) status
(q) Shift paddle actuation
(r) Yaw rate
(s) Whether a trailer is connected to the vehicle
(t) Surface gradient (incline)

In some embodiments the controller 40 is configured to cause the driveline 5 to operate in the four wheel drive mode at least when any one of the following conditions is met:
(a) An amount of relative slip between front and rear wheels exceeds a prescribed value—this may be useful where wheels of only one axle are driven, since it may be assumed that slip of the wheels that are not being driven by the powertrain is relatively low;

(b) Clutch temperature exceeds an upper prescribed value;
(c) Clutch temperature is below a lower prescribed value;
(d) A prescribed warmup period since key-on has not yet expired; and
(e) Lateral acceleration exceeds a threshold value.

If the driveline 5 is in the four wheel drive mode, the controller 40 may be configured to cause the driveline 5 to assume the two wheel drive mode if each of the following conditions are met:
(a) Vehicle speed exceeds a prescribed value, optionally 35 kph;
(b) Lateral acceleration is below a prescribed threshold value;
(c) Clutch closure force is below a prescribed threshold value;
(d) A disconnect delay period since the driveline 5 last assumed the four wheel drive mode has expired; and
(e) No driveline fault has been detected.

In some embodiments, if the vehicle 1 is operated in the eco mode, the controller 40 causes the driveline 5 to assume and remain in the two wheel drive mode substantially continually in order to enhance fuel economy.

If some embodiments, if the vehicle 1 is operated in a driving mode other than SP OFF or eco mode and the driveline 5 is in the two wheel drive mode, the controller 40 may be configured to cause the driveline 5 to assume the four wheel drive mode if any one of the following conditions are met:
(a) A reverse gear is engaged;
(b) An ABS system intervenes to reduce brake force to reduce wheel slip;
(c) A DSC system intervenes to increase or reduce brake force at a wheel;
(d) A HDC system intervenes to apply braking to slow the vehicle.

In some embodiments, when the vehicle is operating in the SP OFF mode the controller 40 is operable to cause the vehicle to operate in the two wheel drive mode under any of the following driving conditions:
(a) The vehicle is driving over straight and level terrain;
(b) The vehicle is cornering under steady state conditions;
(c) The vehicle is decelerating with no driver input, for example for a reason other than driver application of a brake pedal such as due to engine braking.

In some embodiments, when the vehicle is operating in the SP OFF mode the controller 40 is operable to cause the driveline 5 to assume the four wheel drive mode when any one of the following driving conditions are met:
(a) The vehicle is accelerating from a standing start;
(b) An increase in rate of acceleration of the vehicle has taken place, such that the rate of acceleration exceeds a prescribed amount;
(c) An increase in driver demanded torque has taken place whilst cornering such that the amount of driver demanded torque exceeds a prescribed value;
(d) It is determined that a difference exists between the coefficient of friction between a driving surface and one wheel of the vehicle and the coefficient of friction between a driving surface and another wheel of the vehicle, that exceeds a prescribed amount;
(e) It is determined that the vehicle is climbing a hill having a gradient exceeding a prescribed value.

It is to be understood that some embodiments of the present invention may be used with a range of different types of driveline.

Figure 13:
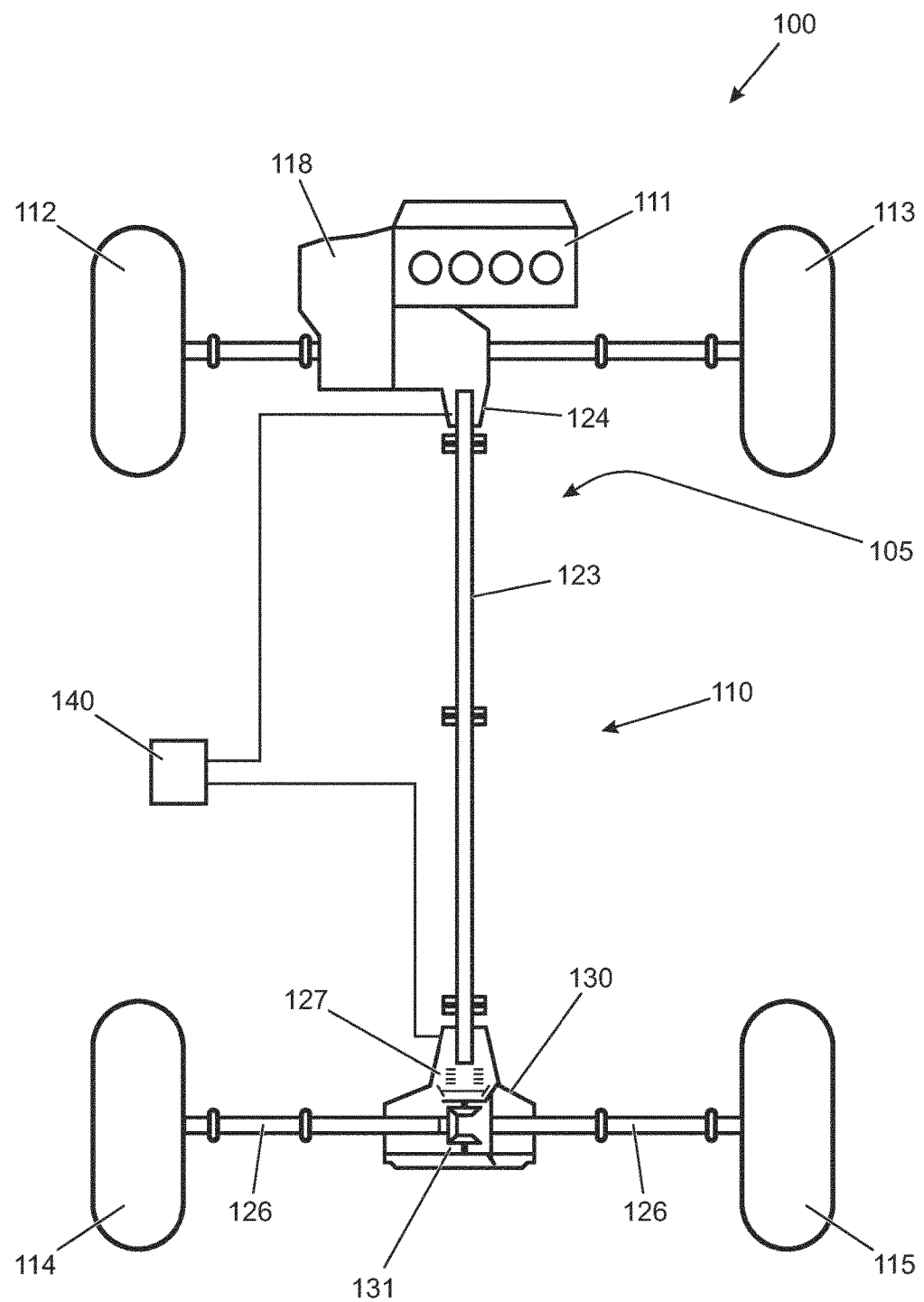
FIG. 13 shows a motor vehicle according to an embodiment of the present invention.

FIG. 13 illustrates a portion of a vehicle 100 according to a further embodiment of the present invention. Like features of the embodiment of FIG. 13 to those of the embodiment of FIG. 1 are shown with like reference signs incremented by 100.

The vehicle 100 has a driveline 105 having a PTU 124 having a PTC (not shown) configured to allow a prop shaft 123 to be connected to a gearbox 118. At an opposite end of the prop shaft 123, a rear drive unit 130 is provided having a clutch 127 in the form of a multi-plate wet clutch. The RDU 130 also has a differential gear arrangement 131 for driving respective left and right rear drive shafts 126. The clutch 127 is configured to connect the prop shaft 123 to an input portion of the differential gear arrangement 131. It is to be understood that the controller 140 is configured to cause the vehicle 100 to operate in the two wheel drive mode by controlling the PTU 124 to disconnect the prop shaft 123 from the gearbox 118, and controlling the clutch 127 of the RDU 130 to disconnect the prop shaft 123 from the differential 131. The controller 140 is also configured to cause the vehicle to operate in the four wheel drive mode by controlling the PTU 124 to connect the prop shaft 123 to the gearbox 118, and controlling the clutch 127 of the RDU 130 to connect the prop shaft 123 to the differential 131. In the embodiment of FIG. 13 the PTU 124 has a PTC in the form of a multi-plate wet clutch. In an alternative embodiment the PTC is in the form of a dog clutch, the PTU 124 also having a synchroniser for synchronising the speed of rotation of input and output portions of the PTC when it is required to close the dog clutch.

Figure 14:
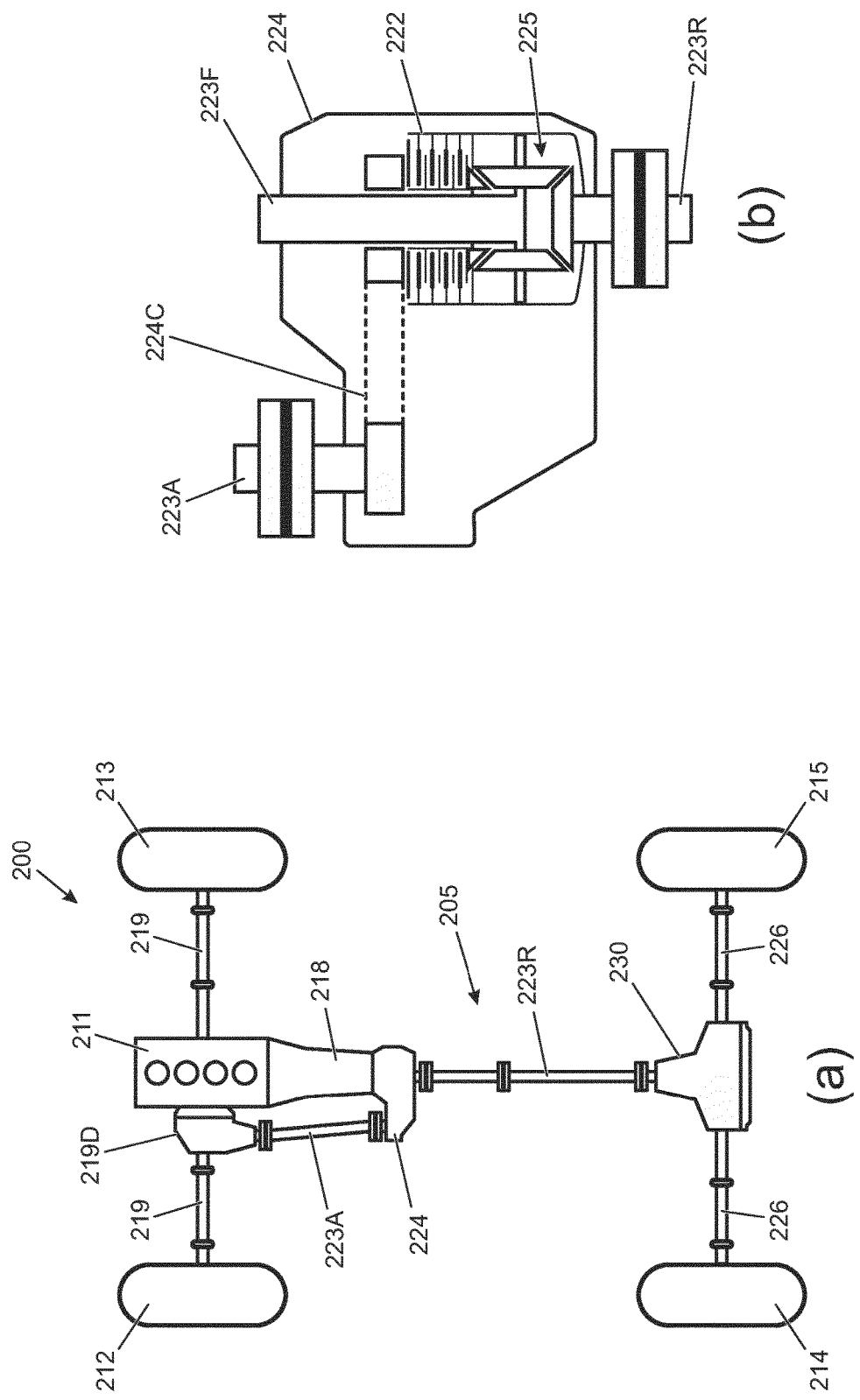
FIG. 14 shows (a) a motor vehicle according to a further embodiment of the invention and (b) an enlarged view of a portion of the driveline of the vehicle.

FIG. 14(*a*) illustrates a portion of a vehicle 200 according to a further embodiment of the present invention. Like features of the embodiment of FIG. 14 to those of the embodiment of FIG. 1 are shown with like reference signs incremented by 200. FIG. 14(*b*) is an enlarged view of a portion of the driveline 205 of the vehicle 200 shown in (a) and shows detail in respect of PTU 224.

The driveline 205 has a front prop shaft 223F (FIG. 14(*b*)) that is permanently connected to a gearbox 218 and a rear prop shaft 223R that is connected to the front prop shaft 223F by means of a differential gear arrangement 225. In the embodiment shown the differential 225 may be referred to as a 'centre differential' or 'centre diff' and forms part of the PTU 224. The differential 225 allows the front and rear prop shafts 223F, 223R to rotate at different respective speeds.

The rear prop shaft 223R is connected to an RDU 230 that is configured to allow the rear prop shaft 223R to be connected to and disconnected from rear wheels 214, 215. In the embodiment of FIG. 14 the RDU 230 is similar to RDU 130 of the embodiment of FIG. 13 although other types of RDU may be useful such as RDU 30 of the embodiment of FIG. 1.

The PTU 224 has a PTC 222 that allows the front prop shaft 223F to be releasably connected to an auxiliary prop shaft 223A via a chain drive 224C. The PTC 22 is a multi-plate wet clutch in the embodiment of FIG. 14 although other types of clutch may be useful in some embodiments such as a dog clutch. The auxiliary prop shaft 223A is in turn arranged to drive a pair of front drive shafts 219 via a front differential unit 219D. The front differential unit 219D has a differential gear arrangement that allows the prop shafts 219 to rotate at different respective speeds.

Figure 15:
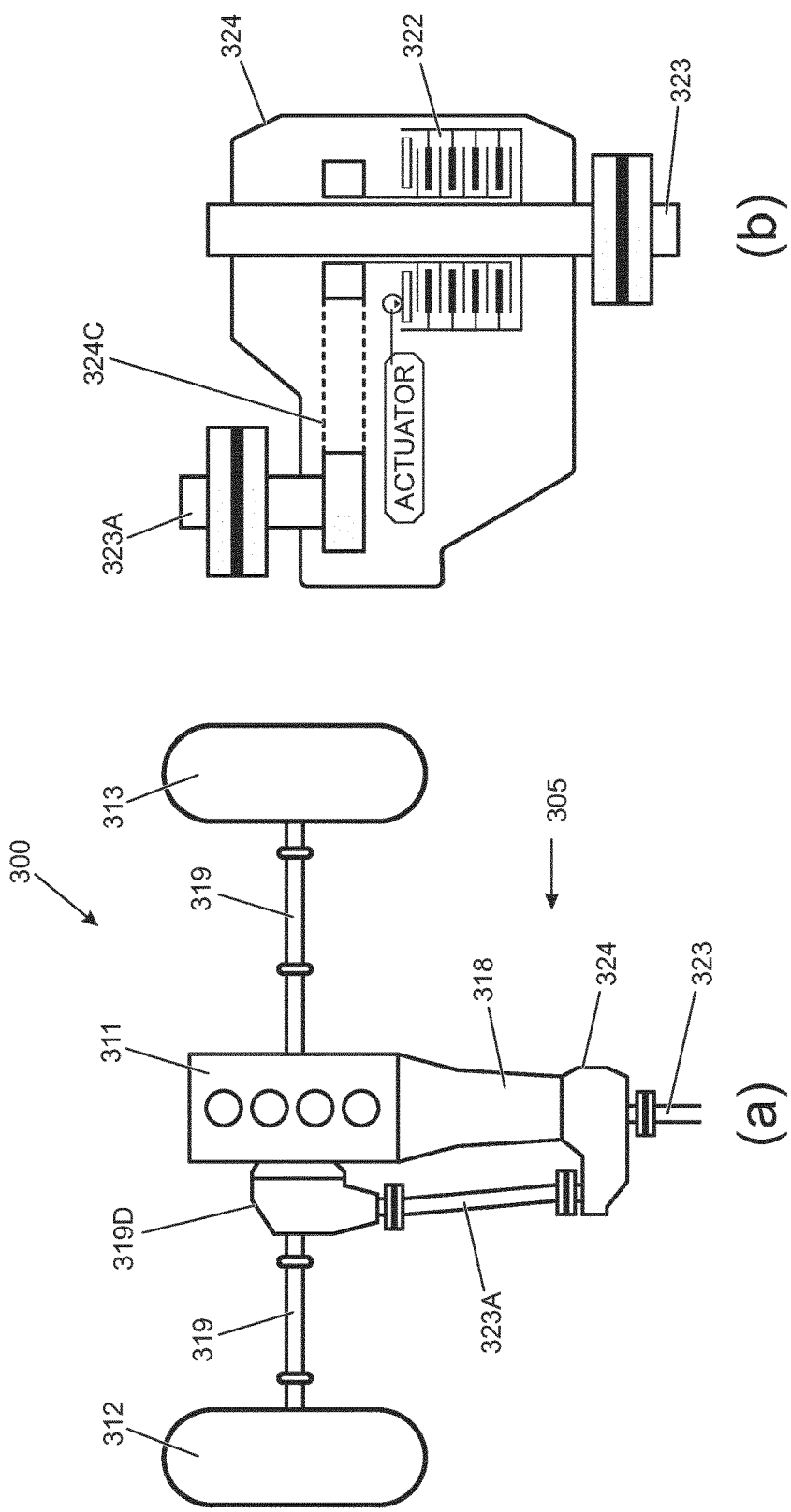
FIG. 15 shows (a) a portion of a driveline of a vehicle according to a still further embodiment of the invention and (b) an enlarged view of a portion of the driveline of the vehicle.

In some embodiments the PTU 224 may be provided without the differential 225. FIG. 15 shows a portion of a driveline 305 having such a PTU. Like features of the embodiment of FIG. 15 to those of the embodiment of FIG. 1 are shown with like reference signs incremented by 300.

In the arrangement of FIG. 15, a single prop shaft connects gearbox 318 and an RDU (not shown). That is, the driveline 305 does not have separate front and rear prop shafts 223F, 223R. A PTC in the form of a multi-plate wet clutch 322 is provided that is configured to allow the prop shaft 323 to be connected to an auxiliary prop shaft 323A that is arranged in turn to drive a front differential unit 319D. The PTC 322 is arranged to drive the auxiliary prop shaft 323A via a chain drive 324C.

Embodiments of the present invention may be understood by reference to the following numbered paragraphs:

1. A motor vehicle driveline having:
    at least first and second groups of one or more wheels; and
    a controller,
    the driveline being operable by means of the controller to connect a torque transmission path from at least one prime mover to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
    the driveline being operable to connect the second group to the torque transmission path by means of an auxiliary portion thereof, the auxiliary portion comprising first and second releasable torque transmitting devices and a prop shaft, the first releasable torque transmitting device being operable to connect a first end of the prop shaft to the torque transmission path from the at least one prime mover, the second releasable torque transmitting device being operable to connect a second end of the prop shaft to the second group of one or more wheels,
    when the driveline is in the first mode the controller being operable to cause the driveline to transition to the second mode when one or more trigger conditions in respect of one or more vehicle operating parameters is met, the one or more trigger conditions being determined at least in part in dependence on a speed value corresponding to vehicle speed.

2. A driveline according to paragraph 1 wherein each trigger condition has a respective identity, the controller being operable to control the driveline to transition from the first mode to the second mode at a prescribed connect rate.

3. A driveline according to paragraph 2 wherein the connect rate is determined in dependence at least in part on the identity of the trigger condition that is met.

4. A driveline according to paragraph 2 wherein the connect rate is determined at least in part in dependence on the vehicle speed value.

5. A driveline according to paragraph 1 wherein the set of trigger conditions includes the condition that an instantaneous amount of torque being delivered to one or more wheels is above a prescribed instantaneous torque threshold, the prescribed instantaneous torque threshold being determined at least in part in dependence on vehicle speed value.

6. A driveline according to paragraph 1 wherein the set of trigger conditions includes the condition that an instantaneous amount of torque developed by the at least one prime mover is above a prescribed instantaneous prime mover torque threshold, the prescribed instantaneous prime mover torque threshold being determined at least in part in dependence on vehicle speed value.

7. A driveline according to paragraph 1 wherein the set of trigger conditions includes the condition that a steering angle is above a prescribed steering angle threshold, the prescribed steering angle threshold being determined at least in part in dependence on vehicle speed value.

8. A driveline according to paragraph 1 wherein the set of trigger conditions includes the condition that a rate of change of steering angle exceeds a steering angle rate threshold, the steering angle rate threshold being determined at least in part in dependence on vehicle speed value.

9. A driveline according to paragraph 7 wherein the set of trigger conditions includes the condition that a rate of change of steering angle exceeds a steering angle rate threshold, the steering angle rate threshold being determined at least in part in dependence on vehicle speed value and wherein the set of trigger conditions includes the condition that steering angle and rate of change of steering angle exceed respective threshold values.

10. A driveline according to paragraph 1 wherein the set of trigger conditions includes the condition that an amount of slip of one or more wheels exceeds a prescribed slip threshold, the prescribed slip threshold being determined at least in part in dependence on vehicle speed value.

11. A driveline according to paragraph 1 wherein the set of trigger conditions includes the condition that an instantaneous amount of lateral acceleration is above a prescribed instantaneous lateral acceleration threshold, the prescribed instantaneous lateral acceleration threshold being determined at least in part in dependence on vehicle speed value.

12. A driveline according to paragraph 1 wherein the set of trigger conditions includes the condition that a throttle or accelerator pedal position value is above a prescribed pedal position threshold, the prescribed pedal position value threshold being determined at least in part in dependence on vehicle speed value.

13. A driveline according to paragraph 1 wherein the controller is operable to cause the prop shaft to be disconnected from both the torque transmission path from the at least one prime mover and said second group of one or more wheels when the driveline is in the first mode.

14. A driveline according to paragraph 1 wherein the at least one prime mover comprises at least one selected from amongst an engine and an electric machine.

15. A driveline according to paragraph 1 wherein the at least one prime mover comprises an engine and an electric machine.

16. A vehicle comprising a driveline according to paragraph 1.

17. A vehicle according to paragraph 16 wherein the controller is operable to control the vehicle to operate in a selected one of a plurality of driving modes in each of which one or more vehicle sub-systems are operated in a prescribed one of a plurality of respective configurations.

18. A vehicle according to paragraph 17 wherein the set of one or more trigger conditions are determined at least in part in dependence on the selected driving mode.

19. A method of operating a motor vehicle driveline comprising causing by means of a controller a torque transmission path from at least one prime mover to be connected to first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
    the method comprising connecting the second group to the torque transmission path by means of an auxiliary portion of the driveline, the auxiliary portion comprising first and second releasable torque transmitting devices and a prop shaft, the first releasable torque transmitting device being operable to connect a first end of the prop shaft to the torque transmission path from the at least one prime mover, the second releasable torque transmitting device being operable to connect a second end of the prop shaft to the second group of one or more wheels, when the driveline is in the first mode the method comprising causing the driveline to transition to the second mode when one or more trigger conditions in respect of one or more vehicle operating parameters is met, the one or more trigger conditions being determined at least in part in dependence on a speed value corresponding to vehicle speed.

20. A motor vehicle driveline having:
at least first and second groups of one or more wheels; and
a controller,
the driveline being operable by means of the controller to connect a torque transmission path from at least one prime mover to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the driveline being operable to connect the second group to the torque transmission path by means of an auxiliary portion thereof, the auxiliary portion comprising first and second releasable torque transmitting devices and a prop shaft, the first releasable torque transmitting device being operable to connect a first end of the prop shaft to the torque transmission path from the at least one prime mover, the second releasable torque transmitting device being operable to connect a second end of the prop shaft to the second group of one or more wheels,
when the driveline is in the first mode the controller being operable to cause the driveline to transition to the second mode when one or more trigger conditions in respect of one or more vehicle operating parameters is met, the one or more trigger conditions being determined at least in part in dependence on vehicle speed or a speed of the driveline.

21. A method of operating a motor vehicle driveline comprising causing by means of a controller a torque transmission path from at least one prime mover to be connected to first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the method comprising connecting the second group to the torque transmission path by means of an auxiliary portion of the driveline, the auxiliary portion comprising first and second releasable torque transmitting devices and a prop shaft, the first releasable torque transmitting device being operable to connect a first end of the prop shaft to the torque transmission path from the at least one prime mover, the second releasable torque transmitting device being operable to connect a second end of the prop shaft to the second group of one or more wheels, when the driveline is in the first mode the method comprising causing the driveline to transition to the second mode when one or more trigger conditions in respect of one or more vehicle operating parameters is met, the one or more trigger conditions being determined at least in part in dependence on vehicle speed or a speed of the driveline.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle driveline having:
at least first and second groups of one or more wheels; and
control means,
the driveline being operable by means of the control means to connect a torque transmission path from prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the driveline being operable to connect the second group to the torque transmission path by an auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels,
when the driveline is in the first mode the control means being configured to cause the driveline to transition to the second mode when one or more of a plurality of trigger conditions is met, each of the trigger conditions being met when an instant value of a vehicle operating parameter exceeds a respective threshold value, each respective threshold value being determined by the control means at least in part in dependence on a speed value corresponding to vehicle speed.

2. A driveline according to claim 1, wherein each trigger condition has a respective identity, the control means being configured to control the driveline to transition from the first mode to the second mode at a prescribed connect rate.

3. A driveline according to claim 2, wherein the connect rate is determined in dependence at least in part on the identity of the trigger condition that is met.

4. A driveline according to claim 2, wherein the connect rate is determined at least in part in dependence on the speed value.

5. A driveline according to claim 1, wherein the one or more trigger conditions include a condition wherein an instantaneous amount of torque being delivered to one or more of the wheels is above a prescribed instantaneous torque threshold, the prescribed instantaneous torque threshold being determined at least in part in dependence on the speed value.

6. A driveline according to claim 1, wherein the one or more trigger conditions include a condition wherein an instantaneous amount of torque developed by the prime mover means is above a prescribed instantaneous prime mover torque threshold, the prescribed instantaneous prime mover torque threshold being determined at least in part in dependence on the speed value.

7. A driveline according to claim 1, wherein the one or more trigger conditions include a condition wherein a steering angle is above a prescribed steering angle threshold, the prescribed steering angle threshold being determined at least in part in dependence on the speed value.

8. A driveline according to claim 7, wherein the one or more trigger conditions include a condition wherein a rate of change of steering angle exceeds a steering angle rate threshold, the steering angle rate threshold being determined at least in part in dependence on the speed value.

9. A driveline according to claim 8, wherein the one or more trigger conditions include a condition wherein steering angle and rate of change of steering angle exceed respective threshold values.

10. A driveline according to claim 1, wherein the one or more trigger conditions includes a condition wherein an amount of slip of one or more wheels exceeds a prescribed slip threshold, the prescribed slip threshold being determined at least in part in dependence on the speed value.

11. A driveline according to claim 1, wherein the one or more trigger conditions include a condition wherein an instantaneous amount of lateral acceleration is above a prescribed instantaneous lateral acceleration threshold, the prescribed instantaneous lateral acceleration threshold being determined at least in part in dependence on the speed value.

12. A driveline according to claim 1, wherein the one or more trigger conditions include a condition wherein a throttle or accelerator pedal position value is above a prescribed pedal position threshold, the prescribed pedal position threshold being determined at least in part in dependence on the speed value.

13. A driveline according to claim 1, wherein the control means is configured to cause the prop shaft to be disconnected from both the torque transmission path from the prime mover means and said second group of one or more wheels when the driveline is in the first mode.

14. A driveline according to claim 1, wherein the prime mover means comprises at least one of an engine and an electric machine.

15. A driveline according to claim 1, wherein the prime mover means comprises an engine and an electric machine.

16. A vehicle comprising a driveline according to claim 1.

17. A vehicle according to claim 16, wherein the control means is configured to control the vehicle to operate in a selected one of a plurality of driving modes in each of which one or more vehicle sub-systems are operated in a prescribed one of a plurality of respective configurations.

18. A vehicle according to claim 17, wherein the one or more trigger conditions are determined at least in part in dependence on the selected driving mode.

19. A method of operating a motor vehicle driveline comprising:
causing by means of control means a torque transmission path from prime mover means to be connected to first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation;
connecting the second group to the torque transmission path by means of an auxiliary portion of the driveline, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels; and
when the driveline is in the first mode, causing the driveline to transition to the second mode when one or more of a plurality of trigger conditions is met, each of the trigger conditions being met when an instant value of a vehicle operating parameter exceeds a respective threshold value, each respective threshold value being determined by the control means at least in part in dependence on a speed value corresponding to vehicle speed.

20. A motor vehicle driveline having:
at least first and second groups of one or more wheels; and control means,
the driveline being operable by means of the control means to connect a torque transmission path from prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the driveline being operable to connect the second group to the torque transmission path by means of an auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels,
when the driveline is in the first mode the control means being operable to cause the driveline to transition to the second mode when one or more of a plurality of trigger conditions is met, each of the trigger conditions being met when an instant value of a vehicle operating parameter exceeds a respective threshold value, each respective threshold value being determined by the control means at least in part in dependence on a vehicle speed or a speed of the driveline.

21. A method of operating a motor vehicle driveline comprising:
causing by means of control means a torque transmission path from prime mover means to be connected to first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation;

connecting the second group to the torque transmission path by means of an auxiliary portion of the driveline, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels; and when the driveline is in the first mode causing the driveline to transition to the second mode when one or more of a plurality of trigger conditions is met, each of the trigger conditions being met when an instant value of a vehicle operating parameter exceeds a respective threshold value, each respective threshold value being determined by the control means at least in part in dependence on a vehicle speed or a speed of the driveline.

* * * * *